US011908383B2

(12) United States Patent
Pyun et al.

(10) Patent No.: US 11,908,383 B2
(45) Date of Patent: Feb. 20, 2024

(54) DISPLAY DEVICE

(71) Applicant: Samsung Display Co., Ltd., Yongin-Si (KR)

(72) Inventors: Kihyun Pyun, Gwangmyeong-si (KR); Jang-Mi Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/083,296

(22) Filed: Dec. 16, 2022

(65) Prior Publication Data

US 2023/0368724 A1 Nov. 16, 2023

(30) Foreign Application Priority Data

May 13, 2022 (KR) ........................ 10-2022-0058791

(51) Int. Cl.
*G09G 3/20* (2006.01)

(52) U.S. Cl.
CPC ....... *G09G 3/2096* (2013.01); *G09G 2310/08* (2013.01); *G09G 2330/028* (2013.01); *G09G 2360/12* (2013.01)

(58) Field of Classification Search
CPC ............. G09G 3/2096; G09G 2310/08; G09G 2330/028; G09G 2360/12
See application file for complete search history.

(56) References Cited

U.S. PATENT DOCUMENTS

2001/0014922 A1* 8/2001 Kuge .................. G06F 13/4239 710/36
2009/0115443 A1* 5/2009 Lai ......................... G11C 29/56 324/762.02
2012/0047411 A1* 2/2012 Lai ................... G01R 31/31937 714/721
2012/0146965 A1* 6/2012 Baek ...................... G09G 3/006 345/204
2013/0036335 A1* 2/2013 Kim ....................... G09G 3/006 714/704
2018/0068600 A1* 3/2018 Kim ..................... G09G 3/2096
2022/0006460 A1* 1/2022 Hung .................... H03L 7/0807
2023/0117376 A1* 4/2023 Jeon ..................... G09G 3/2096 345/55

FOREIGN PATENT DOCUMENTS

KR 10-2011-0005106 A 1/2011
KR 10-2016-0012584 A 2/2016
KR 10-2019-0085264 A 7/2019

* cited by examiner

*Primary Examiner* — Dmitriy Bolotin
(74) *Attorney, Agent, or Firm* — Innovation Counsel LLP

(57) ABSTRACT

A display device is disclosed that includes a display panel, a data driver, a timing controller, a memory device, and a power voltage generator. The display panel includes pixels. The data driver is configured to apply data voltages to the pixels. The timing controller is configured to control the data driver, to generate a test strobe signal by shifting a phase of a strobe signal, to perform a test write operation and a test read operation with the memory device based on the test strobe signal, and to increase a power voltage when an error bit occurs in the test write operation and the test read operation. The memory device is configured to sample memory data received from the timing controller using the strobe signal and to store sampled memory data. The power voltage generator is configured to apply the power voltage to the memory device.

20 Claims, 20 Drawing Sheets

| | stage1 | stage2 | stage3 | stage4 | PV |
|---|---|---|---|---|---|
| case1 | NOT BE | NOT BE | NOT BE | NOT BE | IV |
| case2 | BE | NOT BE | NOT BE | NOT BE | IV + RV1 |
| case3 | BE | BE | NOT BE | NOT BE | IV + RV2 |
| case4 | BE | BE | BE | NOT BE | IV + RV3 |
| case5 | BE | BE | BE | BE | IV + RV4 |

FIG. 13

| | stage1 | stage2 | stage3 | stage4 | PV |
|---|---|---|---|---|---|
| case1 | NOT BE | NOT BE | NOT BE | NOT BE | IV |
| case2 | BE | NOT BE | NOT BE | NOT BE | IV |
| case3 | BE | BE | NOT BE | NOT BE | IV + RV1 |
| case4 | BE | BE | BE | NOT BE | IV + RV2 |
| case5 | BE | BE | BE | BE | IV + RV3 |

FIG. 16

| | stage1 | stage2 | stage3 | stage4 | PV |
|---|---|---|---|---|---|
| case1 | NOT BE | NOT BE | NOT BE | NOT BE | IV |
| case2 | BE | NOT BE | NOT BE | NOT BE | IV - FV1 |
| case3 | BE | BE | NOT BE | NOT BE | IV - FV2 |
| case4 | BE | BE | BE | NOT BE | IV - FV3 |
| case5 | BE | BE | BE | BE | IV - FV4 |

FIG. 17

| | stage1 | stage2 | stage3 | stage4 | PV |
|---|---|---|---|---|---|
| case1 | NOT BE | NOT BE | NOT BE | NOT BE | IV |
| case2 | BE | NOT BE | NOT BE | NOT BE | IV |
| case3 | BE | BE | NOT BE | NOT BE | IV - FV1 |
| case4 | BE | BE | BE | NOT BE | IV - FV2 |
| case5 | BE | BE | BE | BE | IV - FV3 |

DISPLAY DEVICE

PRIORITY STATEMENT

This application claims priority under 35 U.S.C. § 119 to Korean Patent Application No. 10-2022-0058791, filed on May 13, 2022 in the Korean Intellectual Property Office KIPO, the contents of which are herein incorporated by reference in their entireties.

BACKGROUND

1. Field

The present inventive concept relates to a display device. More particularly, the present inventive concept relates to a display device including a memory device.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The display device may include a memory device that exchanges data with the timing controller during operation of the display device. The memory device may receive a power voltage and use the power voltage as a core voltage or an operating voltage of an input/output buffer. In particular, when the power voltage is used as the operating voltage of the input/output buffer, ripple of the power voltage may be greater than when only the core voltage is used. Also, as the ripple increases, noise (e.g., simultaneous switching noise; SSN) of the power voltage may increase. As a result, an error bit may occur in a write operation and a read operation performed by the timing controller and the memory device.

Also, a capacitance of a capacitor may decrease over time. Accordingly, the capacitance of the capacitor connected to an output terminal of the power voltage generator generating a power voltage may be reduced. Due to the decrease in capacitance, there is a problem in that the ripple characteristic of the power voltage is changed.

SUMMARY

Embodiments of the present inventive concept may provide a display device that change a power voltage.

Embodiments of the present inventive concept may also provide a display device in which a power voltage is varied in consideration of a decrease in a capacitance.

An embodiment of a display device includes a display panel including pixels, a data driver configured to apply data voltages to the pixels, a timing controller configured to control the data driver, to generate a test strobe signal by shifting a phase of a strobe signal, to perform a test write operation and a test read operation with a memory device based on the test strobe signal, and configured to increase a power voltage when an error bit occurs in the test write operation and the test read operation, the memory device configured to sample memory data received from the timing controller using the strobe signal and to store sampled memory data, and a power voltage generator configured to apply the power voltage to the memory device.

In an embodiment, the timing controller may be configured to perform the test write operation and the test read operation again when the error bit occurs in the test write operation and the test read operation.

In an embodiment, the timing controller may be configured to stop the test write operation and the test read operation when the error bit does not occur in the test write operation and the test read operation.

In an embodiment, the timing controller may be configured to perform the test write operation and the test read operation when the display device is powered on.

In an embodiment, the test strobe signal may include a first positive test strobe signal generated by shifting the phase of the strobe signal by a first positive reference phase and a first negative test strobe signal generated by shifting the phase of the strobe signal by a first negative reference phase, and the timing controller may be configured to increase the power voltage when the error bit occurs in the test write operation and the test read operation performed based on the first positive test strobe signal or the first negative test strobe signal.

In an embodiment, the timing controller may be configured to perform the test write operation and the test read operation again when the error bit occurs in the test write operation and the test read operation performed based on the first positive test strobe signal or the first negative test strobe signal.

In an embodiment, the timing controller may be configured to stop the test write operation and the test read operation when the error bit does not occur in the test write operation and the test read operation performed based on the first positive test strobe signal and the first negative test strobe signal.

In an embodiment, the test strobe signal may include a second positive test strobe signal generated by shifting the phase of the strobe signal by a second positive reference phase and a second negative test strobe signal generated by shifting the phase of the strobe signal by a second negative reference phase, the timing controller may be configured to increase the power voltage by a first rising value when the error bit occurs in the test write operation and the test read operation performed based on the first positive test strobe signal or the first negative test strobe signal and the error bit does not occur in the test write operation and the test read operation performed based on the second positive test strobe signal and the second negative test strobe signal, and the timing controller may be configured to increase the power voltage by a second rising value greater than the first rising value when the error bit occurs in the test write operation and the test read operation performed based on the first positive test strobe signal or the first negative test strobe signal and the error bit occurs in the test write operation and the test read operation performed based on the second positive test strobe signal or the second negative test strobe signal.

In an embodiment, an absolute value of the second positive reference phase may be smaller than an absolute of the first positive reference phase, and an absolute value of the second negative reference phase may be smaller than an absolute of the first negative reference phase.

In an embodiment, the test strobe signal may include a second positive test strobe signal generated by shifting the phase of the strobe signal by a second positive reference phase and a second negative test strobe signal generated by shifting the phase of the strobe signal by a second negative reference phase, the timing controller may be configure to maintain the power voltage when the error bit occurs in the test write operation and the test read operation performed based on the first positive test strobe signal or the first negative test strobe signal and the error bit does not occur in the test write operation and the test read operation performed based on the second positive test strobe signal and the second negative test strobe signal, and the timing controller may be configured to increase the power voltage when the error bit occurs in the test write operation and the test read operation performed based on the first positive test strobe signal or the first negative test strobe signal and the error bit occurs in the test write operation and the test read operation performed based on the second positive test strobe signal or the second negative test strobe signal.

In an embodiment, the power voltage may be applied to an input/output buffer of the memory device.

In an embodiment, the power voltage generator may be configured to apply the power voltage to the timing controller, and the power voltage may be used as a core voltage of the timing controller and a core voltage of the memory device.

In an embodiment, the power voltage may be initialized to an initial voltage when the display device is powered on.

In an embodiment, the initial voltage may be a minimum value of a voltage range of a supply voltage according to an interface standard between the timing controller and the memory device.

An embodiment of a display device includes a display panel including pixels, a data driver configured to apply data voltages to the pixels, a timing controller configured to control the data driver, to generate a test strobe signal by shifting a phase of a strobe signal, to perform a test write operation and a test read operation with a memory device based on the test strobe signal, and configured to decrease a power voltage when an error bit occurs in the test write operation and the test read operation, the memory device configured to sample memory data received from the timing controller using the strobe signal and to store sampled memory data, and a power voltage generator configured to apply the power voltage to the memory device.

In an embodiment, the test strobe signal may include a first positive test strobe signal generated by shifting the phase of the strobe signal by a first positive reference phase and a first negative test strobe signal generated by shifting the phase of the strobe signal by a first negative reference phase, and the timing controller may be configured to decrease the power voltage when the error bit occurs in the test write operation and the test read operation performed based on the first positive test strobe signal or the first negative test strobe signal.

In an embodiment, the test strobe signal may include a second positive test strobe signal generated by shifting the phase of the strobe signal by a second positive reference phase and a second negative test strobe signal generated by shifting the phase of the strobe signal by a second negative reference phase, the timing controller may be configured to decrease the power voltage by a first falling value when the error bit occurs in the test write operation and the test read operation performed based on the first positive test strobe signal or the first negative test strobe signal and the error bit does not occur in the test write operation and the test read operation performed based on the second positive test strobe signal and the second negative test strobe signal, and the timing controller may be configured to decrease the power voltage by a second falling value greater than the first falling value when the error bit occurs in the test write operation and the test read operation performed based on the first positive test strobe signal or the first negative test strobe signal and the error bit occurs in the test write operation and the test read operation performed based on the second positive test strobe signal or the second negative test strobe signal.

In an embodiment, an absolute value of the second positive reference phase may be smaller than an absolute of the first positive reference phase, and an absolute value of the second negative reference phase may be smaller than an absolute of the first negative reference phase.

In an embodiment, the power voltage may be initialized to an initial voltage when the display device is powered on.

In an embodiment, the initial voltage may be a maximum value of a voltage range of a supply voltage according to an interface standard between the timing controller and the memory device.

Therefore, the display device may determine a power voltage at which an error bit does not occur by generating a test strobe signal by shifting a phase of a strobe signal, performing a test write operation and a test read operation with a memory device based on the test strobe signal, and increasing the power voltage when the error bit occurs in the test write operation and the test read operation. Accordingly, the display device may vary the power voltage in consideration of the ripple characteristic.

In addition, the display device may minimize an occurrence of an error bit while maintaining the margin of a strobe signal by shifting the strobe signal by a first positive reference phase (or a first negative reference phase) to perform a test write operation and a test read operation.

Further, the display device may vary a power voltage in consideration of a decrease in capacitance by performing a test write operation and a test read operation when the display device is powered on.

However, the effects of the present inventive concept are not limited to the above-described effects, and may be variously expanded without departing from the spirit and scope of the present inventive concept.

BRIEF DESCRIPTION OF THE DRAWINGS

FIG. 13 is a table illustrating an example in which a display device according to embodiments of the present inventive concept increases a power voltage.

FIG. 16 is a table illustrating an example in which a display device according to embodiments of the present inventive concept decreases a power voltage.

FIG. 17 is a table illustrating an example in which a display device according to embodiments of the present inventive concept decreases a power voltage.

DETAILED DESCRIPTION OF THE INVENTIVE CONCEPT

Hereinafter, the present inventive concept will be explained in detail with reference to the accompanying drawings.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Figure 1:
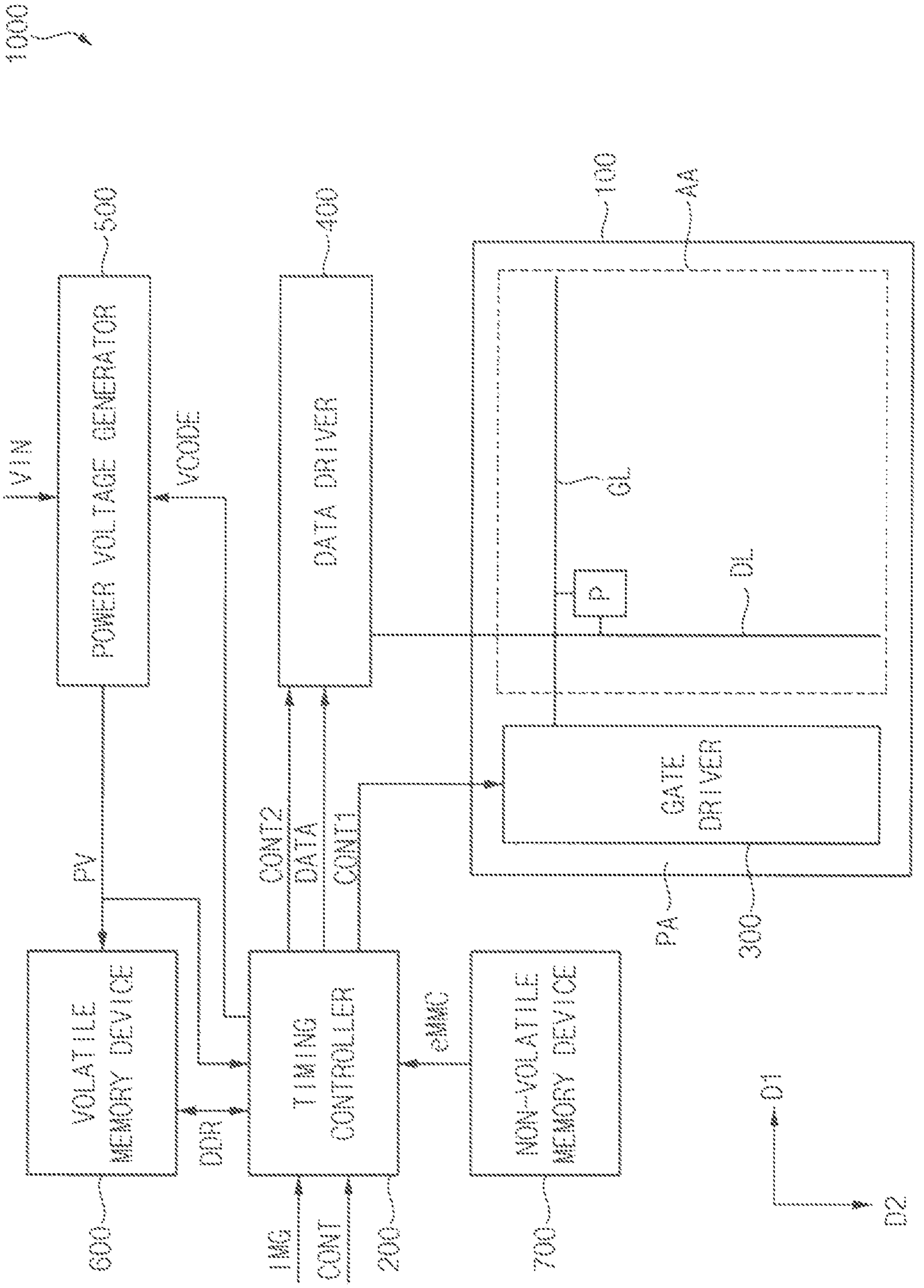
FIG. 1 is a block diagram illustrating a display device according to embodiments of the present inventive concept.

FIG. 1 is a block diagram illustrating a display device 1000 according to embodiments of the present inventive concept.

Referring to FIG. 1, the display device 1000 may include a display panel 100, a timing controller 200, a gate driver 300, a data driver 400, a power voltage generator 500, a memory device 600, and a non-memory device 700. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The power voltage generator 500 may receive an input voltage VIN and generate a power voltage PV based on the input voltage VIN. The power voltage generator 500 may receive a voltage code VCODE from the timing controller 200. The power voltage generator 500 may determine a voltage value of the power voltage PV according to the voltage code VCODE. For example, the power voltage generator 500 may transmit/receive data to and from the timing controller 200 according to a DDR interface standard.

The power voltage generator 500 may apply the power voltage PV to the timing controller 200 and the memory device 600. The power voltage PV may be applied to an input/output buffer of the memory device 600. For example, the power voltage PV may be used as an operating voltage of the input/output buffer. In an embodiment, the power voltage PV may be used as a core voltage of the timing controller 200 and a core voltage of the memory device 600. In an embodiment, a plurality of different power voltages may be applied to the timing controller 200 and the memory device 600, and the timing controller 200 and the memory device 600 may use each of the power voltages as the core voltage. Hereinafter, for convenience of description, it is assumed that one type of power voltage PV is applied.

The memory device 600 may exchange memory data with the timing controller while the display device 1000 is being driven. The memory data may be data stored in the memory device 600. For example, the timing controller 200 and the memory device 600 may perform a write operation to store memory data in the memory device 600. For example, the timing controller 200 and the memory device 600 may apply stored memory data to the timing controller 200 by performing a read operation.

The memory device 600 and the timing controller 200 may transmit/receive data according to a predetermined interface standard. Accordingly, the operating voltage of the input/output buffer of the memory device 600 may be within a voltage range of a supply voltage according to the interface standard. For example, the interface standard may be a double data rate (DDR) interface standard, a low power double data rate (LPDDR) interface standard, or the like. Hereinafter, for convenience of description, it is assumed that data is transmitted and received according to the DDR interface standard.

When the display device 1000 is powered on, the non-memory device 700 may transmit data stored in the non-memory device 700 to the timing controller 200 according to a predetermined interface standard. For example, the interface standard may be an embedded multi-media controller (eMMC) communication standard. Hereinafter, for convenience of description, it is assumed that data is transmitted according to the eMMC interface standard.

Figure 2:
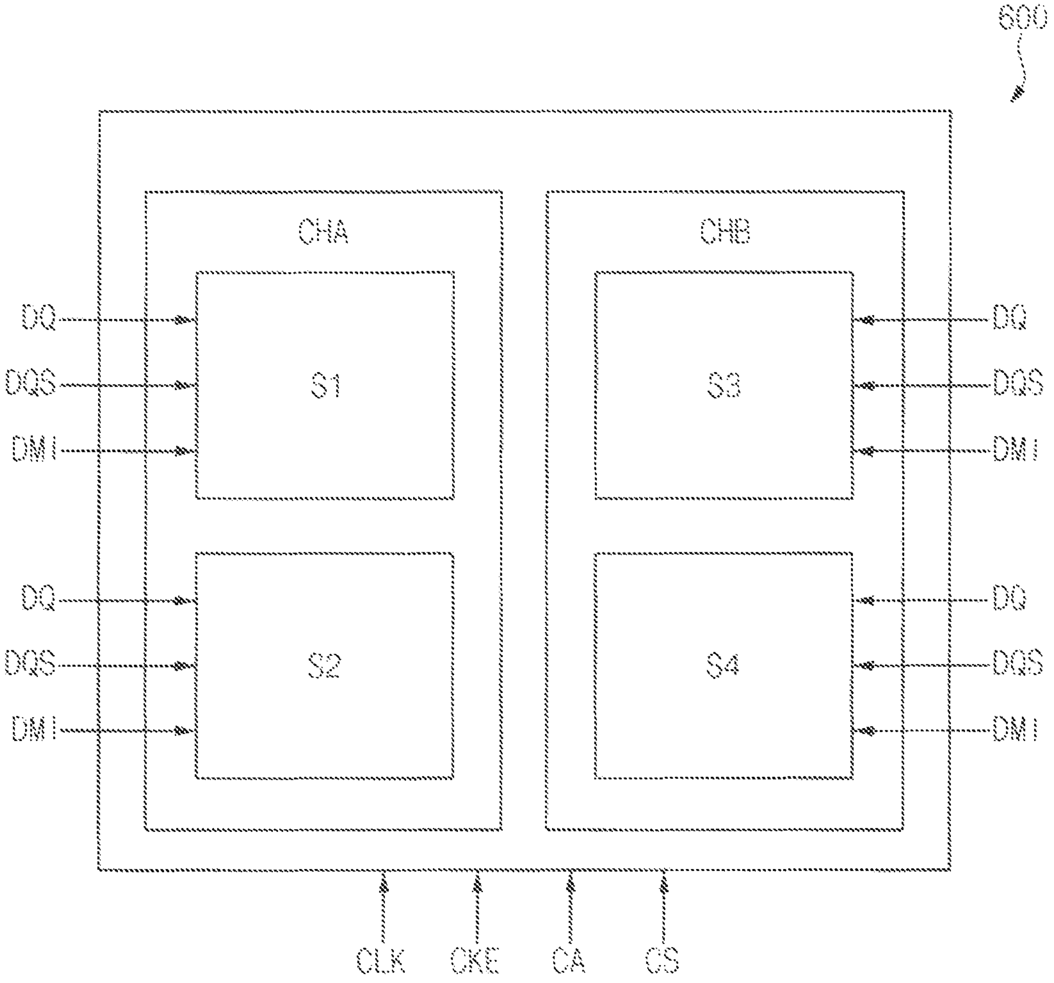
FIG. 2 is a block diagram illustrating an example of the memory device of FIG. 1.

FIG. 2 is a block diagram illustrating an example of the memory device 600 of FIG. 1.

Referring to FIGS. 1 and 2, the memory device 600 may include a plurality of slices S1, S2, S3, and S4 and channels CHA and CHB for transmitting and receiving memory data DQ. For example, a A channel CHA may be a channel for transmitting and receiving the memory data DQ stored in a first slice S1 and a second slice S2. For example, a B channel CHB may be a channel for transmitting and receiving the memory data DQ stored in a third slice S3 and a fourth slice S4.

The slices S1, S2, S3, and S4 may be spaces in which a storage space of the memory device 600 is divided. For example, when the memory device 600 has a storage space of 4 gigabytes, each of the slices S1, S2, S3, and S4 may have a storage space of 1 gigabyte. However, not necessarily all the slices S1, S2, S3, and S4 have the same storage space.

The memory device 600 may receive a memory clock signal CLK, a memory clock enable signal CKE, a command/address signal CA, a chip select signal CS, the memory data DQ, a strobe signal DQS, and a data mask inversion signal DMI from the timing controller 200.

The command/address signal CA may determine an operation of the memory device 600. The command/address signal CA may determine an address at which an operation of the memory device 600 is performed. For example, the timing controller 200 and the memory device 600 may selectively perform the write operation, the read operation, or an erase operation.

For example, the write operation is a series of operations in which the timing controller 200 transmits the memory data DQ to the memory device 600 and the memory device 600 receives and stores the memory data DQ.

For example, the read operation may be an operation in which the memory device 600 transmits the memory data DQ requested by the timing controller 200 to the timing controller 200.

For example, the erase operation may be an operation in which the memory device 600 deletes the memory data DQ requested by the timing controller 200.

The data mask inversion signal DMI may be a signal for a data inversion operation. For example, the data mask inversion signal DMI may be activated when a bit having a value of 1 is repeated for specific bits or more in the transmitted memory data DQ. For example, when the data mask inversion signal DMI is activated, the inverted memory data DQ may be transmitted. Accordingly, power consumption may be reduced.

The memory data DQ and the strobe signal DQS will be described in detail with reference to FIG. 3.

Figure 3:
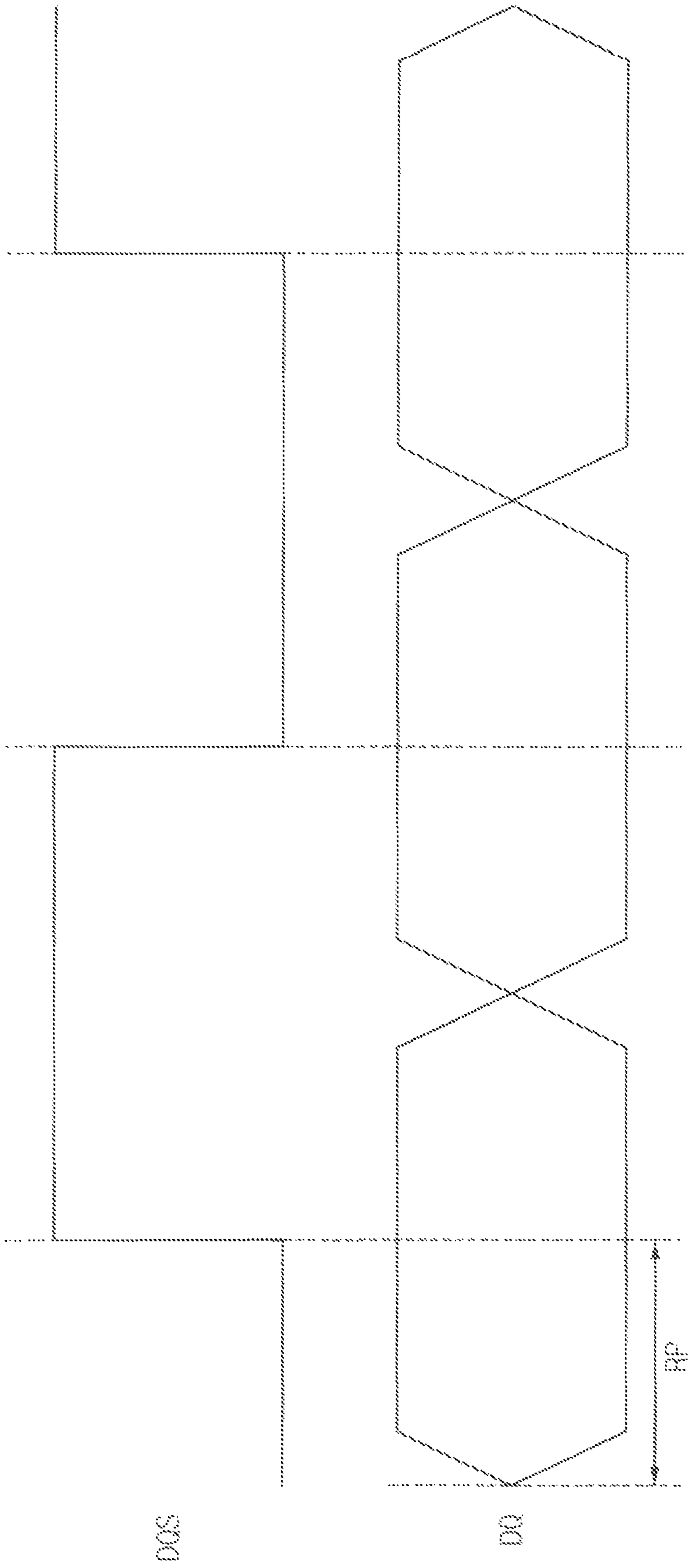
FIG. 3 is a diagram illustrating an example in which the display device of FIG. 1 performs a write operation.

FIG. 3 is a diagram illustrating an example in which the display device 1000 of FIG. 1 performs a write operation.

The memory device 600 may sample the memory data DQ received from the timing controller 200 using the strobe signal DQS and store the sampled memory data.

The strobe signal DQS may have the same frequency as the memory data DQ. A phase of the strobe signal DQS may be different from a phase of the memory data DQ by the reference phase RP.

For example, the memory device 600 may sample the memory data DQ at edges of the strobe signal DQS (e.g., a timing of rising from a low level to a high level, or the timing of falling from a high level to a low level). That is, the edges of the strobe signal DQS may be a criterion for determining a value of the memory data DQ.

Figure 4:
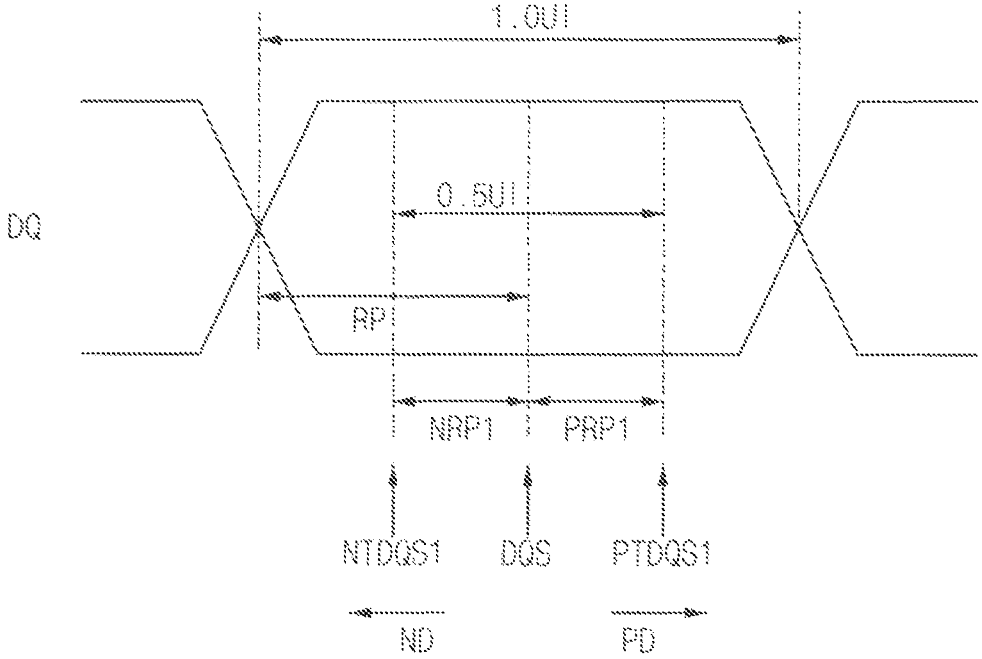
FIG. 4 is a diagram illustrating an example of a margin of a strobe signal of the display device of FIG. 1.

FIG. 4 is a diagram illustrating an example of a margin of the strobe signal EQS of the display device 1000 of FIG. 1.

FIGS. 1 and 4, the margin of the strobe signal DQS may be a range of the phase of the strobe signal DQS in which an error bit does not occur in a test write operation and a test read operation.

For example, the test write operation and the test read operation may be the write operation and the read operation performed based on a test strobe signal generated by shifting the phase of the strobe signal DQS.

The memory data DQ in the write operation (or the test write operation) and memory data DQ in the read operation (or the test read operation) may be the same. However, due to a noise of the power voltage PV (e.g., simultaneous switching noise; SSN), the memory data DQ in the write operation (or the test write operation) and memory data DQ in the read operation (or the test read operation) may be changed. In this case, the changed bit in the memory data DQ may be an error bit.

The margin of the strobe signal DQS may be the sum of the first positive reference phase PRP1 and the first negative reference phase NRP1.

For example, the timing controller 200 may repeat the test write operation and the test read operation while shifting the phase of the strobe signal DQS in a positive direction PD. In this case, a maximum shift amount at which the error bit does not occur may be the first positive reference phase PRP1. In addition, the first positive test strobe signal PTDQS1 may be generated by shifting the phase of the strobe signal DQS by the first positive reference phase PRP1.

For example, the timing controller 200 may repeat the test write operation and the test read operation while shifting the phase of the strobe signal DQS in a negative direction ND. In this case, a maximum shift amount at which the error bit does not occur may be the first negative reference phase NRP1. In addition, the first negative test strobe signal NTDQS1 may be generated by shifting the phase of the strobe signal DQS by the first negative reference phase NRP1.

Hereinafter, for convenience of description, it is assumed that a length of one bit of the memory data DQ is 1.0 UI and the margin of the strobe signal DQS is 0.5 UI.

Figure 5:
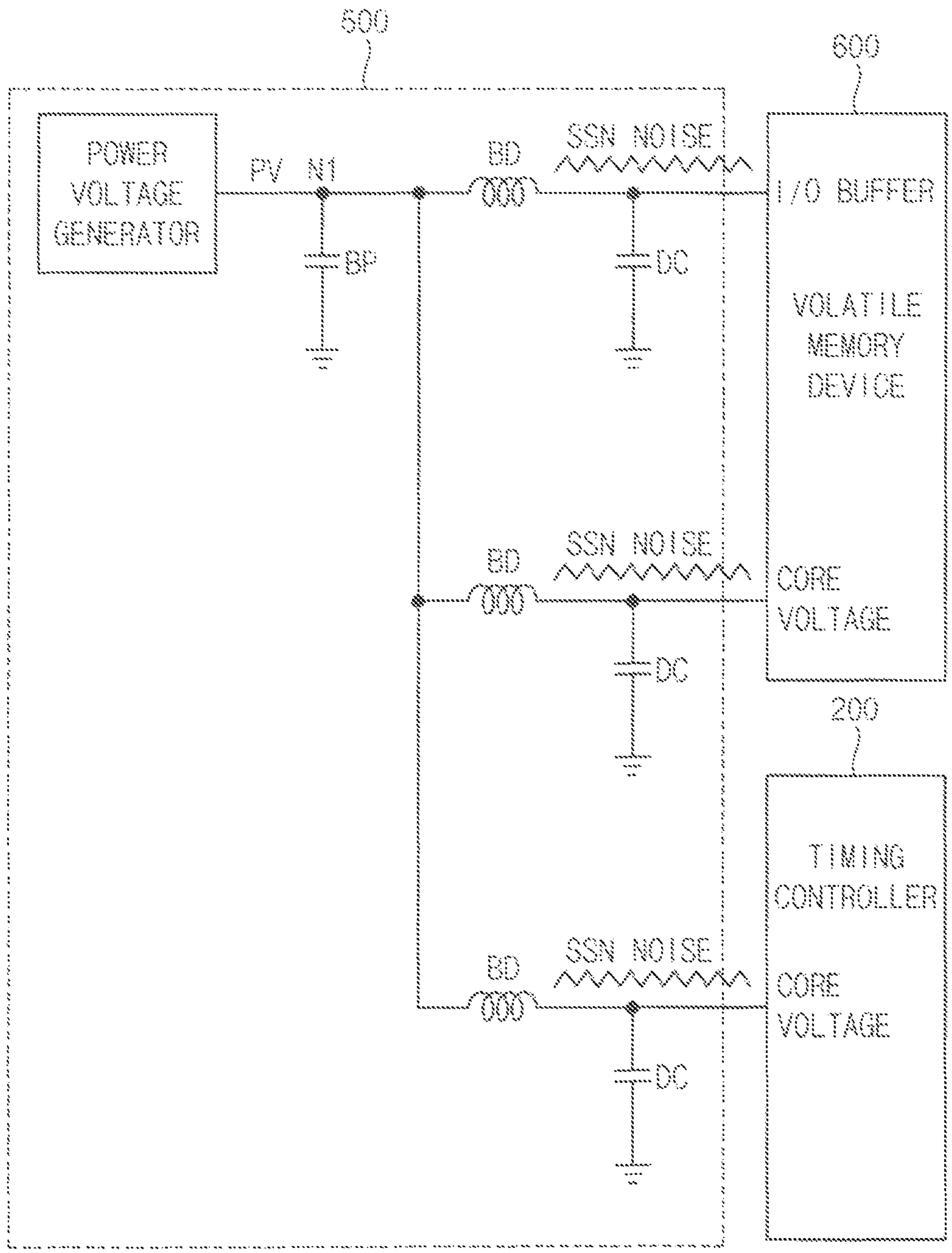
FIG. 5 is a diagram illustrating an example of an output terminal of a power voltage generator of the display device of FIG. 1.

FIG. 5 is a diagram illustrating an example of an output terminal of the power voltage generator 500 of the display device 1000 of FIG. 1.

Referring to FIG. 5, the output terminal of the power voltage generator 500 may include a bypass capacitor BP, a plurality of beads BD, and a plurality of decoupling capacitors DC. The power voltage PV may be applied to the input/output buffer of the memory device 600. The power voltage PV may be used as the core voltage of the memory device 600 and the timing controller 200. The noise of the power voltage PV (e.g., simultaneous switching noise; SSN) may occur at the output terminal of the power voltage generator 500.

For example, the bypass capacitor BP may include a first electrode connected to the first node N1 and a grounded second electrode. Each of the beads BD may include a first electrode connected to the first node N1 and a second electrode connected to the memory device 600 or the timing controller 200. Each of the decoupling capacitors DC may include a first electrode connected to the memory device 600 or the timing controller 200 and a grounded second electrode.

Figure 6:
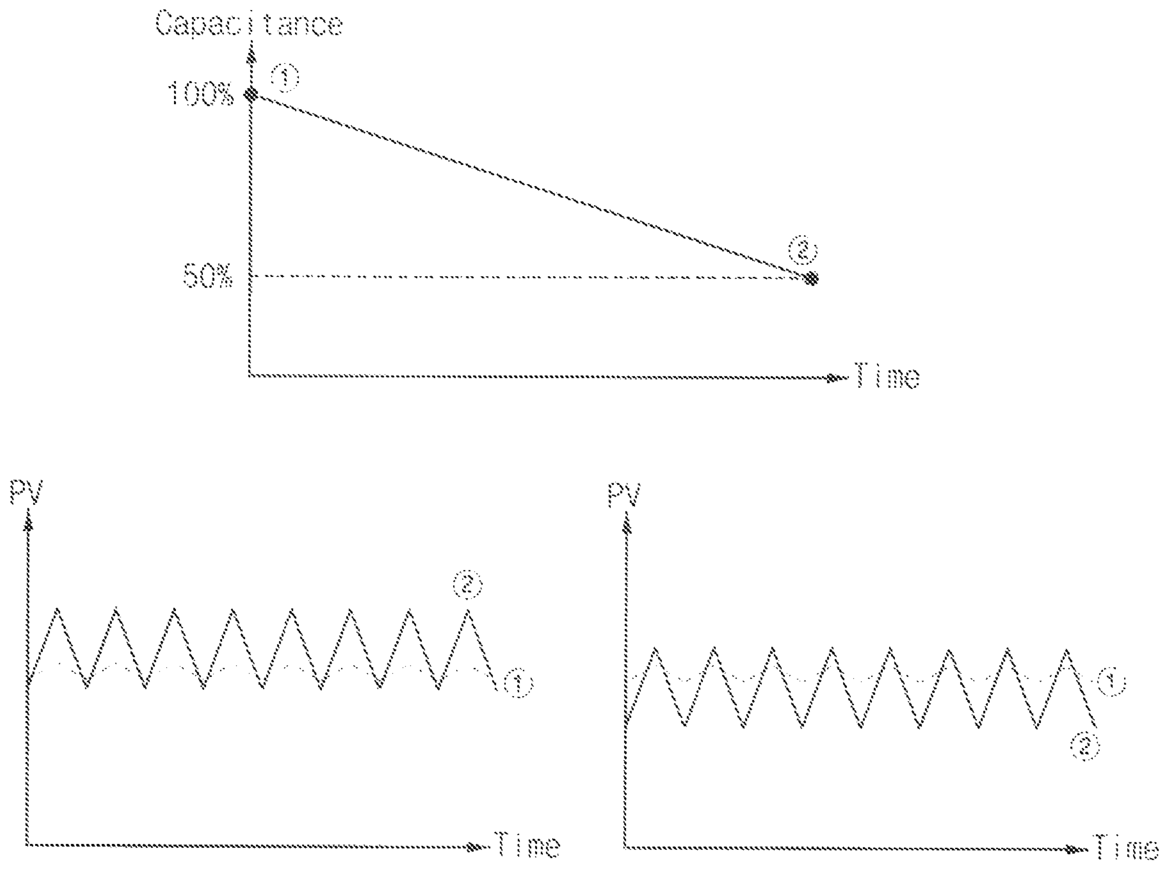
FIG. 6 is a graph illustrating an example of a capacitance decrease characteristic and a power voltage.
Figure 7A:
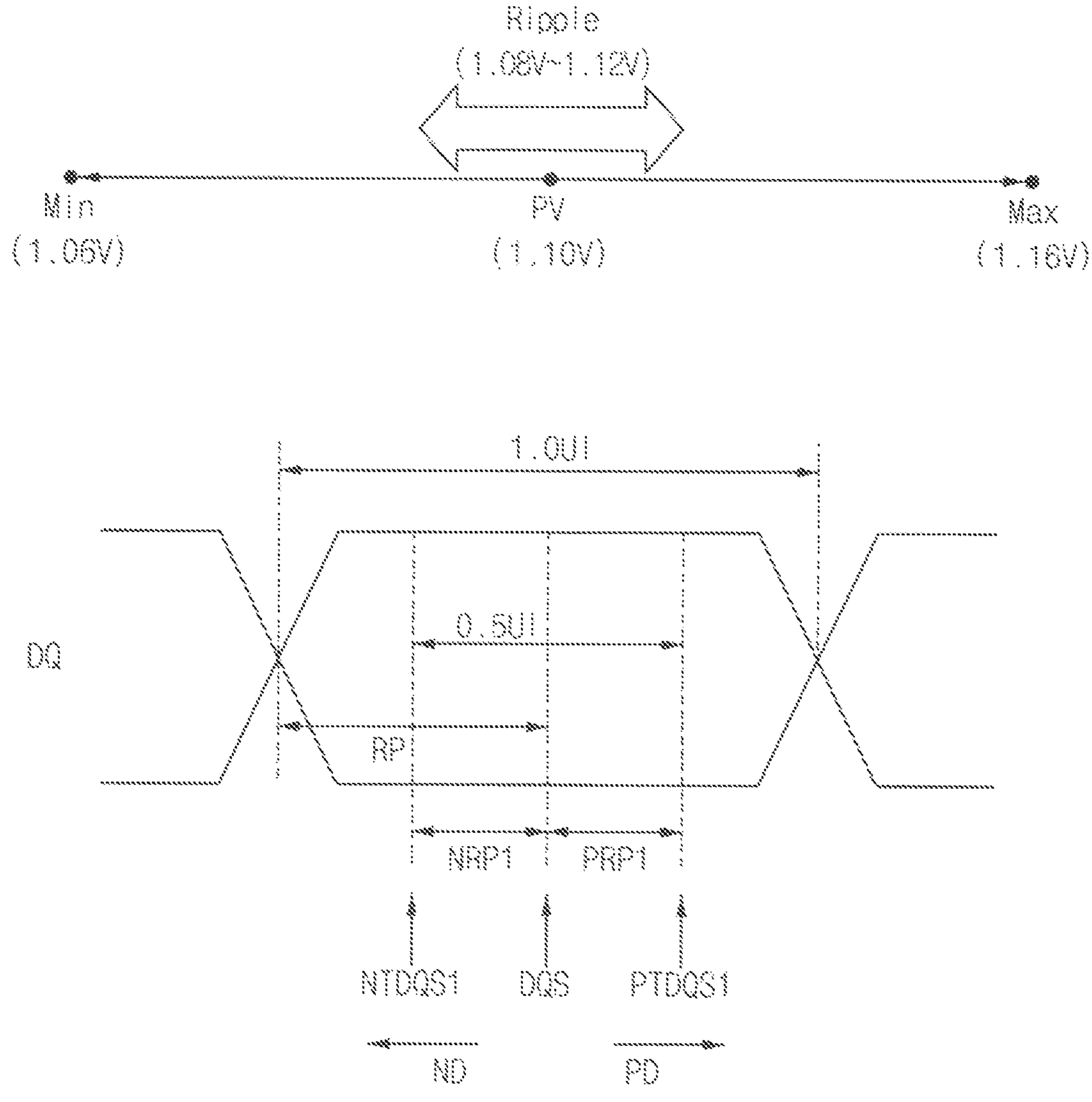
FIGS. 7A, 7B, and 7C are diagrams illustrating an example of a margin of a strobe signal according to a change in a ripple characteristic of a power voltage.
Figure 7B:
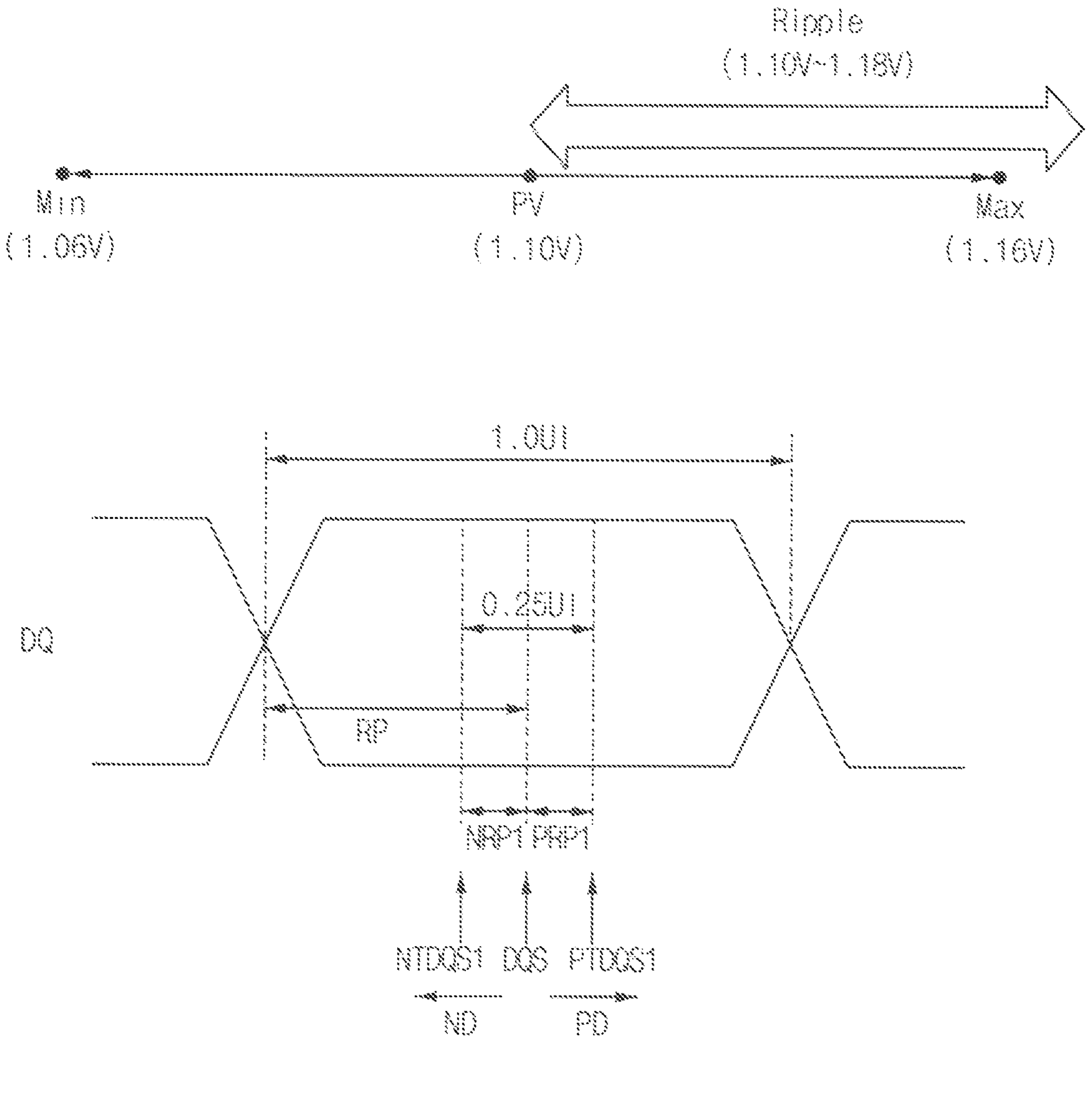
Figure 7C:
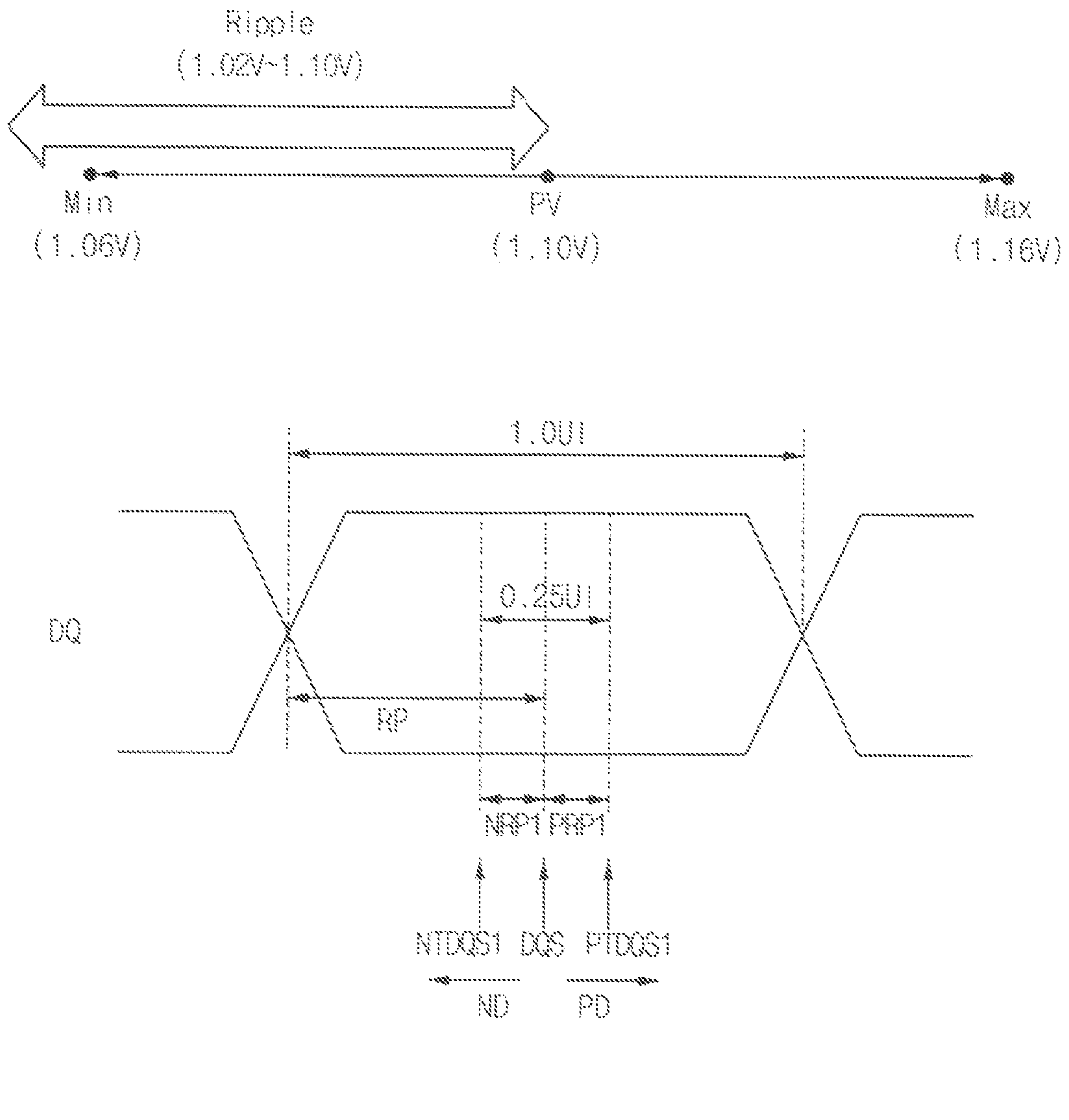

FIG. 6 is a graph illustrating an example of a capacitance decrease characteristic and the power voltage PV, and FIG. 7A to 7C are diagrams illustrating an example of a margin of the strobe signal DQS according to a change in a ripple characteristic of the power voltage PV. FIGS. 6 to 7C are diagrams for explaining problems that may occur when the power voltage PV is not changed.

Referring to FIGS. 5 to 7C, the capacitance may decrease over time according to the capacitance decrease characteristic. Accordingly, the capacitance of the decoupling capacitors DC of the output terminal of the power voltage generator 500 may be decreased.

As shown in FIG. 6, when the capacitance of the decoupling capacitors DC is decreased, ripple of the power voltage PV may increase. For example, when the capacitance of the decoupling capacitors DC is decreased, the ripple may increase in a direction in which the power voltage PV increases. As another example, when the capacitance of the decoupling capacitors DC is decreased, the ripple may increase in a direction in which the power voltage PV decreases.

FIG. 7A is a diagram illustrating an example of the ripple before the capacitances of decoupling capacitors DC are decreased.

For example, the voltage range of the supply voltage according to the interface standard between the timing controller 200 and the memory device 600 may be 1.06V to 1.16V. The power voltage PV may be 1.10V. The ripple of the power voltage PV may be −0.02V to 0.02V. In this case, the power voltage PV may be within the voltage range of the supply voltage according to the interface standard.

FIG. 7B is a diagram illustrating an example of the ripple increasing in the direction in which the power voltage PV increases.

For example, the voltage range of the supply voltage according to the interface standard between the timing controller 200 and the memory device 600 may be 1.06V to 1.16V. The power voltage PV may be 1.10V. The ripple of the power voltage PV may be 0.00V to In this case, the power voltage PV may be out of the voltage range of the supply voltage according to the interface standard. Accordingly, the margin of the strobe signal DQS may be reduced.

FIG. 7C is a diagram illustrating an example of the ripple increasing in the direction in which the power voltage PV decreases.

For example, the voltage range of the supply voltage according to the interface standard between the timing controller 200 and the memory device 600 may be 1.06V to 1.16V. The power voltage PV may be 1.10V. The ripple of the power voltage PV may be −0.08V to In this case, the power voltage PV may be out of the voltage range of the supply voltage according to the interface standard. Accordingly, the margin of the strobe signal DQS may be reduced.

Accordingly, as time goes by, the power voltage PV deviates from the interface standard, and a probability that an error occurs in the write operation and the read operation may increase.

Figure 8:
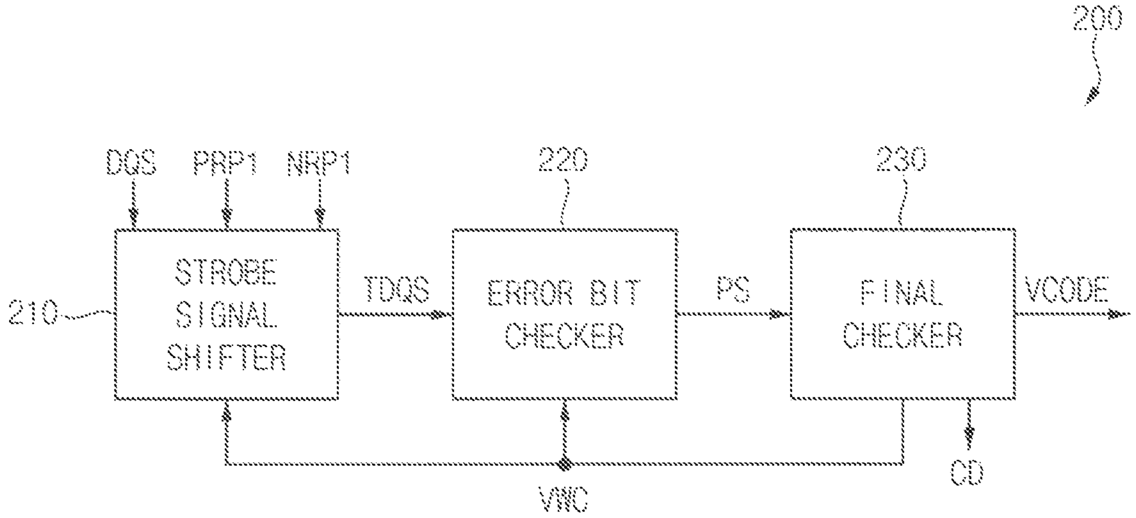
FIG. 8 is a diagram illustrating an example of a timing controller of the display device of FIG. 1.
Figure 9:
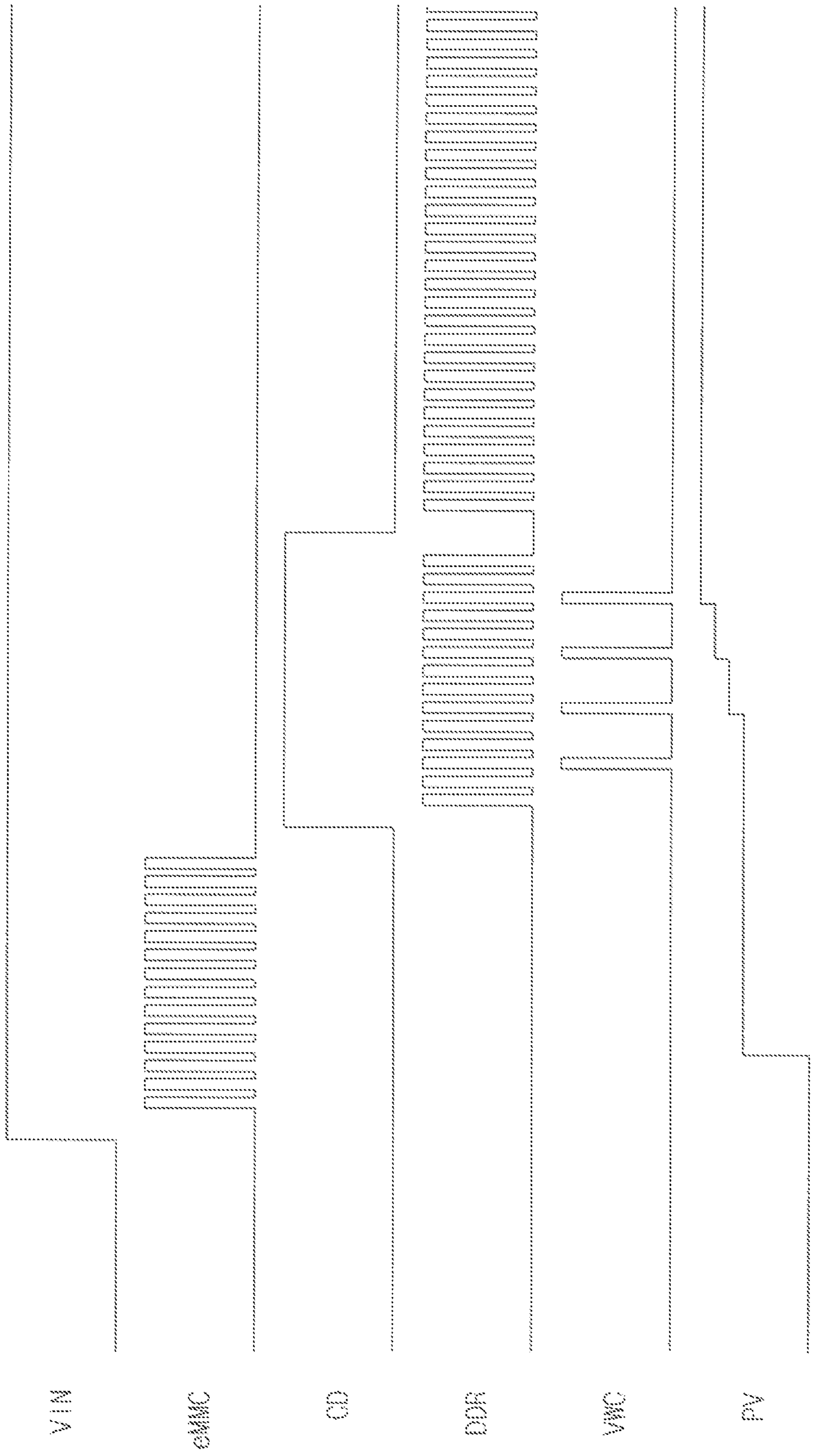
FIG. 9 is a diagram illustrating an example of an operation of the display device of FIG. 1.

FIG. 8 is a diagram illustrating an example of the timing controller 200 of the display device 1000 of FIG. 1. FIG. 9 is a diagram illustrating an example of an operation of the display device 1000 of FIG. 1.

FIGS. 1, 4, 8, and 9, the timing controller 200 may include a strobe signal shifter 210, an error bit checker 220, and a final checker 230.

The strobe signal shifter 210 may shift the phase of the strobe signal DQS to generate the test strobe signal TDQS.

The error bit checker 220 may perform the test write operation and the test read operation with the memory device 600 based on the test strobe signal TDQS. The error bit checker 220 may output a pass signal PS having an activation level to the final checker 230 when the error bit occurs in the test write operation and the test read operation.

The final checker 230 may increase the power voltage PV when the error bit occurs in the test write operation and the test read operation. For example, the final checker 230 may generate a voltage code VCODE corresponding to a voltage value higher than a voltage value of a previous power voltage to the power voltage generator 500 when the error bit occurs in the test write operation and the test read operation.

When the pass signal having a deactivation level is applied to the final checker 230, a final check signal CD may have a high level. When the pass signal having the activation level is applied to the final checker 230, the final check signal CD may have a low level.

When the pass signal having the deactivation level is applied to the final checker 230, the final checker 230 may apply a valid window check enable signal VWC having the activation level to the strobe signal shifter 210 and the error bit checker 220. The strobe signal shifter 210 may generate the test strobe signal TDQS when the valid window check enable signal VWC having the activation level is applied. The error bit checker 220 may perform the test write operation and the test read operation when the valid window check enable signal VWC is applied.

Accordingly, when the error bit occurs in the test write operation and the test read operation, the timing controller 200 may perform the test write operation and the test read operation again. Also, when the error bit does not occur in the test write operation and the test read operation, the timing controller 200 may stop the test write operation and the test read operation.

The timing controller 200 may perform the test write operation and the test read operation when the display device 1000 is powered on. When the display device 1000 is powered on, voltages for driving the display device 1000 may be applied to the display device 1000.

For example, as shown in FIG. 9, when the display device 1000 is powered on, the input voltage VIN may be applied to the power voltage generator 500. In addition, the power voltage generator 500 may generate the power voltage PV by receiving the input voltage VIN. Also, the timing controller 200 may receive necessary data from the nonmemory device 700 according to the eMMC communication standard.

For example, as shown in FIG. 9, after the timing controller 200 receives the necessary data from the nonmemory device 700, the final check signal CD may become the high level, and the valid window check enable signal VWC having the activation level may be applied to the strobe signal shifter 210 and the error bit checker 220. In addition, the timing controller 200 and the memory device 600 may perform the test write operation and the test read operation.

For example, as shown in FIG. 9, the final checker 230 may perform the test write operation and the test read operation in a period in which the final check signal CD is the high level. The final checker 230 may increase a voltage value of the voltage code VCODE when the error bit occurs in the test write operation and the test read operation. When the error bit does not occur in the test write operation and the test read operation, the final check signal CD may become the low level, and the final checker 230 may stop the test write operation and the test read operation.

Figure 10:
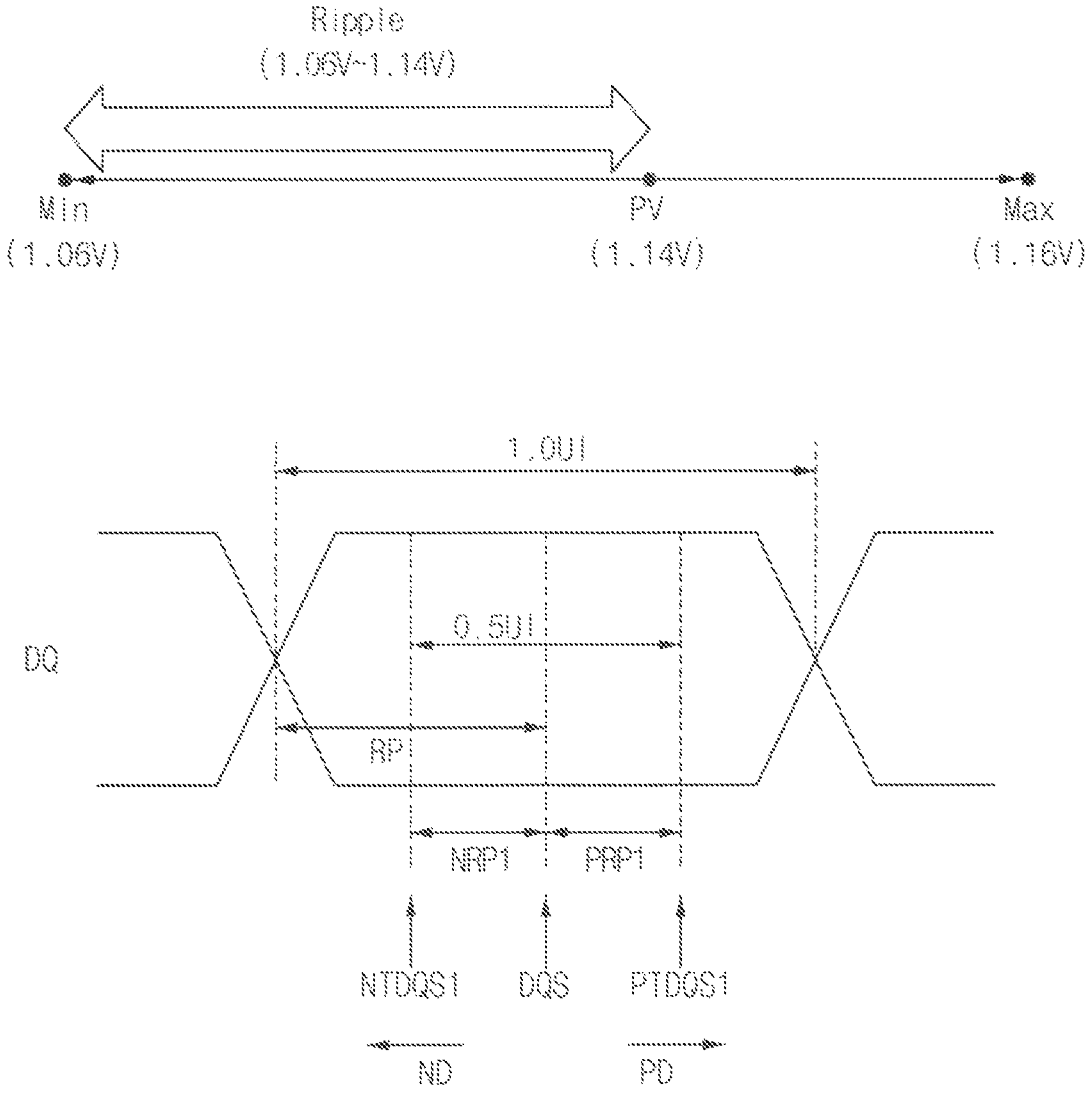
FIG. 10 is a diagram illustrating an example in which the display device of FIG. 1 increases a power voltage.

FIG. 10 is a diagram illustrating an example in which the display device 1000 of FIG. 1 increases the power voltage PV.

Referring to FIGS. 8 and 10, the test strobe signal TDQS may include a first positive test strobe signal PTDQS1 generated by shifting the phase of the strobe signal DQS by the first positive reference phase PRP1 and a first negative test strobe signal NTDQS1 generated by shifting the phase of the strobe signal DQS by the first negative reference phase NRP1. The timing controller 200 may increase the power voltage PV when the error bit occurs in the test write operation and the test read operation performed based on the first positive test strobe signal PTDQS1 or the first negative test strobe signal NTDQS1. That is, when any one of the first positive test strobe signal PTDQS1 and the first negative test strobe signal NTDQS1 generates the error bit, the timing controller 200 may increase the power voltage PV.

The timing controller 200 may perform the test write operation and the test read operation again when the error bit occurs in the test write operation and the test read operation performed based on the first positive test strobe signal PTDQS1 or the first negative test strobe signal NTDQS1. The timing controller 200 may stop the test write operation and the test read operation when the error bit does not occur in the test write operation and the test read operation performed based on the first positive test strobe signal PTDQS1 and the first negative test strobe signal NTDQS1. That is, the timing controller 200 may not increase the power voltage PV when neither the first positive test strobe signal PTDQS1 nor the first negative test strobe signal NTDQS1 generate the error bit.

The power voltage PV may be increased from a preset initial voltage. The power voltage PV may be initialized to the initial voltage when the display device 1000 is powered on. The initial voltage may be a minimum value of the voltage range of the supply voltage according to the interface standard between the timing controller 200 and the memory device 600.

For example, when the voltage range of the supply voltage according to the interface standard between the timing controller 200 and the memory device 600 is 1.06V to 1.16V, the initial voltage may be 1.06V.

For example, as shown in FIG. 10, it is assumed that the ripple increases in the direction in which the power voltage PV decreases, and a range of the ripple is 0.08V. And, for convenience of explanation, it is assumed that the error bit occurs when a voltage value that the power voltage PV can have (i.e., the power voltage PV and the ripple of the power voltage PV) is out of the voltage range of the supply voltage according to the interface standard (in practice, the probability may increase). The power voltage PV may be increased from 1.06V. And, when the power voltage PV rises to 1.14V, the error bit may not occur. Accordingly, the power voltage PV of 1.14V may be applied to the timing controller 200 and the memory device 600. However, when the display device 1000 is powered off and then powered on, the power voltage PV may be 1.06V.

Figures 11, 12A:
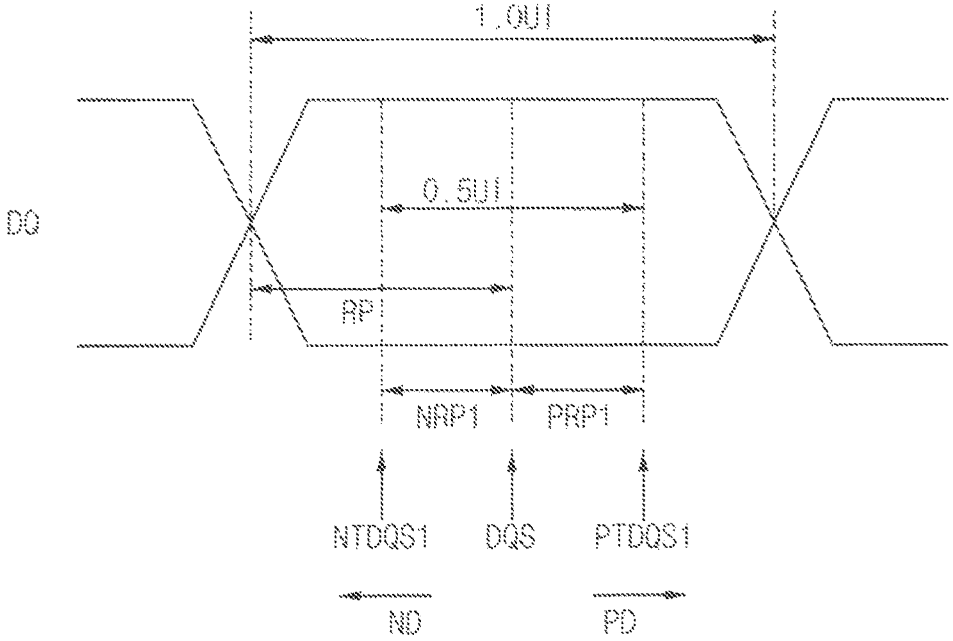
FIG. 11 is a table illustrating an example in which a display device according to embodiments of the present inventive concept increases a power voltage.
FIGS. 12A, 12B, 12C, 12D, and 12E are diagrams illustrating an example in which the display device of FIG. 11 performs a test writing and a test reading.

FIG. 11 is a table illustrating an example in which a display device according to embodiments of the present inventive concept increases the power voltage PV, and FIG. 12A to 12E are diagrams illustrating an example in which the display device of FIG. 11 performs the test writing and the test reading.

The display device according to the present embodiment is substantially the same as the display device 1000 of FIG. 1 except for increasing the power voltage PV. Thus, the same reference numerals are used to refer to the same or similar element, and any repetitive explanation will be omitted.

Figure 12B:
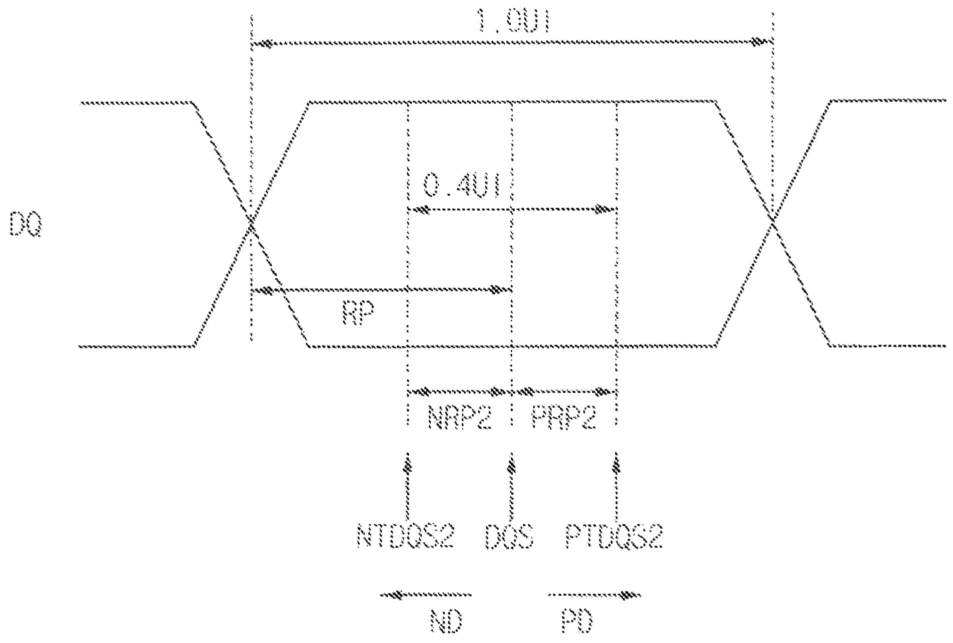
Figure 12C:
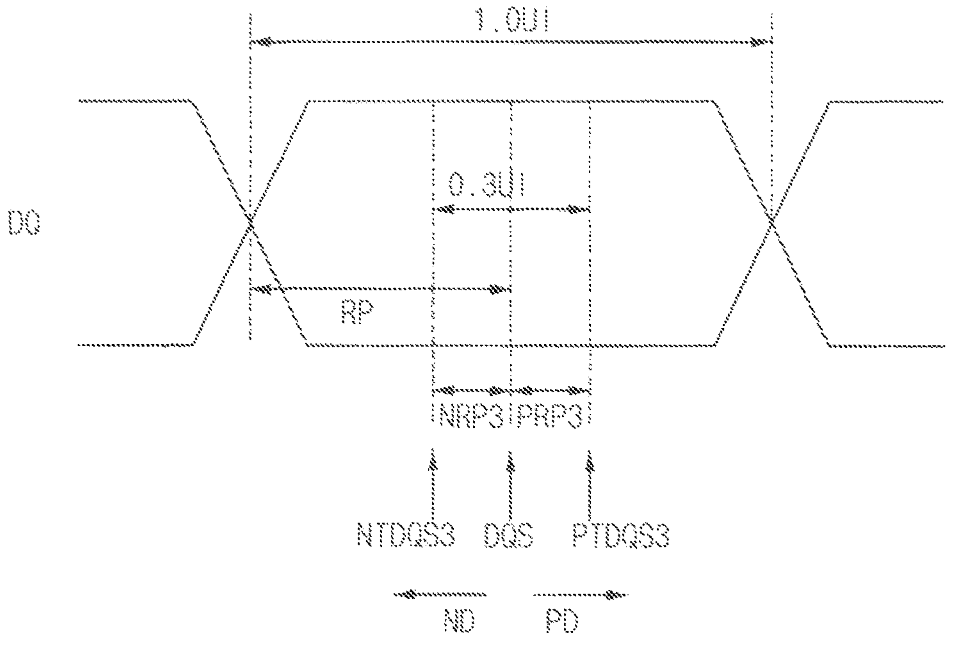
Figure 12D:
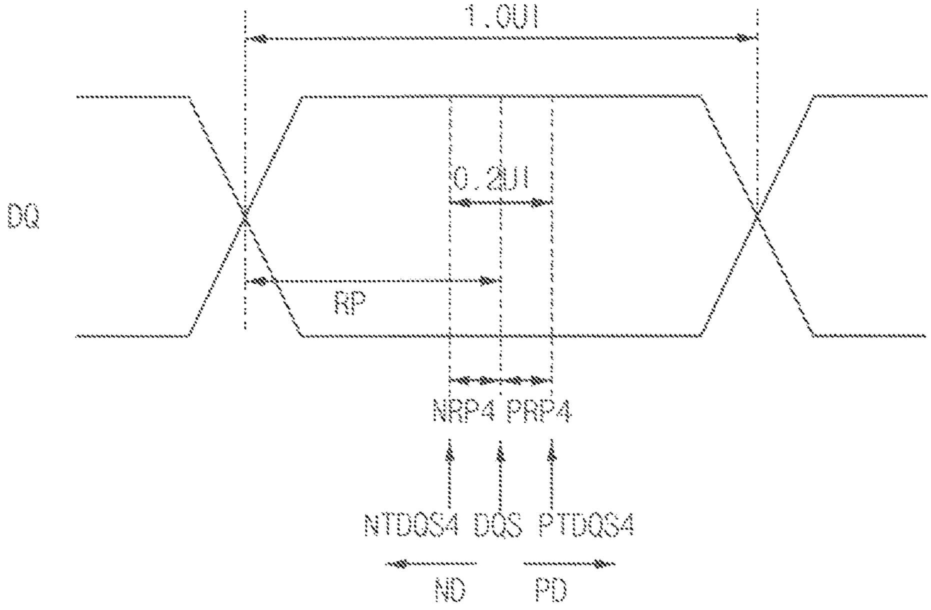
Figure 12E:
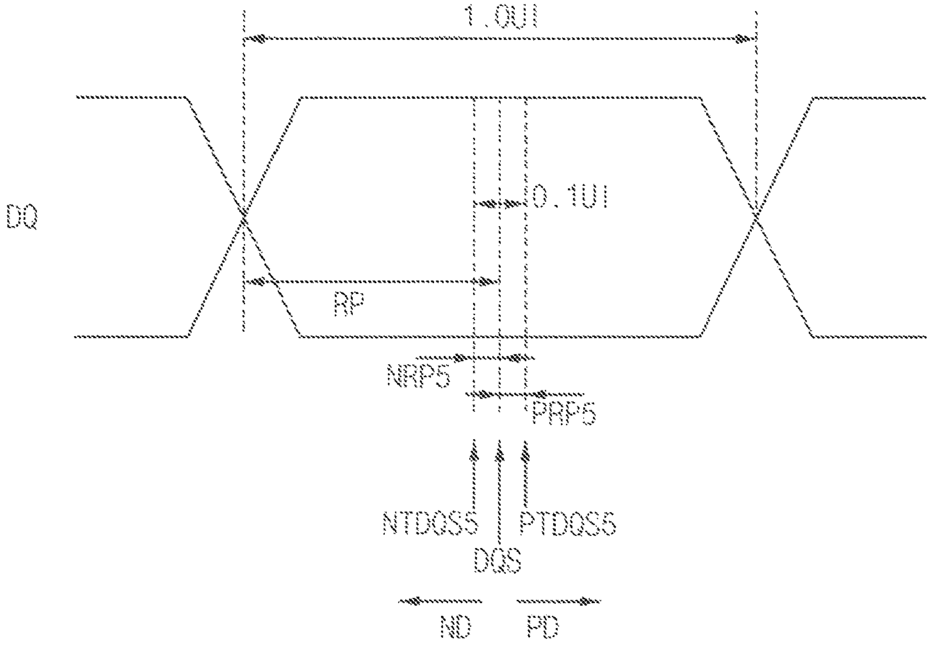

FIGS. 11 to 12E, the timing controller 200 may check whether the error bit BE occurs in a plurality of stages and may increase the power voltage PV. For example, the timing controller 200 may perform the test write operation and the test read operation based on the first positive test strobe signal PTDQS1 and the first negative test strobe signal NTDQS1 (stage1). For example, the timing controller 200 may perform the test write operation and the test read operation based on the second positive test strobe signal PTDQS2 and the second negative test strobe signal NTDQS2 (stage2). For example, the timing controller 200 may perform the test write operation and the test read operation based on the third positive test strobe signal PTDQS3 and the third negative test strobe signal NTDQS3 (stage3). For example, the timing controller 200 may perform the test write operation and the test read operation based on the fourth positive test strobe signal PTDQS4 and the fourth negative test strobe signal NTDQS4 (stage4). For example, the timing controller 200 may perform the test write operation and the test read operation based on the fifth positive test strobe signal PTDQS5 and the fifth negative test strobe signal NTDQS5 (stage5).

FIG. 12A is a diagram for stage1, FIG. 12B is a diagram for stage2, FIG. 12C is a diagram for stage3, FIG. 12D is a diagram for stage4, and FIG. 12E is a diagram for stage5.

The test strobe signal TDQS may include the first positive test strobe signal PTDQS1 generated by shifting the phase of the strobe signal DQS by the first positive reference phase PRP1 and the first negative test strobe signal NTDQS1 generated by shifting the phase of the strobe signal DQS by the first negative reference phase NRP1.

The test strobe signal TDQS may include the second positive test strobe signal PTDQS2 generated by shifting the phase of the strobe signal DQS by the second positive reference phase PRP2 and the second negative test strobe signal NTDQS2 generated by shifting the phase of the strobe signal DQS by the second negative reference phase NRP2.

An absolute value of the second positive reference phase PRP2 may be smaller than an absolute of the first positive reference phase PRP1, and an absolute value of the second negative reference phase NRP2 may be smaller than an absolute of the first negative reference phase NRP1.

The test strobe signal TDQS may include the third positive test strobe signal PTDQS3 generated by shifting the phase of the strobe signal DQS by the third positive reference phase PRP3 and the third negative test strobe signal NTDQS3 generated by shifting the phase of the strobe signal DQS by the third negative reference phase NRP3.

An absolute value of the third positive reference phase PRP3 may be smaller than an absolute of the second positive reference phase PRP2, and an absolute value of the third negative reference phase NRP3 may be smaller than an absolute of the second negative reference phase NRP2.

The test strobe signal TDQS may include the fourth positive test strobe signal PTDQS4 generated by shifting the phase of the strobe signal DQS by the fourth positive reference phase PRP4 and the fourth negative test strobe signal NTDQS4 generated by shifting the phase of the strobe signal DQS by the fourth negative reference phase NRP4.

An absolute value of the fourth positive reference phase PRP4 may be smaller than an absolute of the third positive reference phase PRP3, and an absolute value of the fourth negative reference phase NRP4 may be smaller than an absolute of the third negative reference phase NRP3.

The test strobe signal TDQS may include the fifth positive test strobe signal PTDQS5 generated by shifting the phase of the strobe signal DQS by the fifth positive reference phase PRP5 and the fifth negative test strobe signal NTDQS5 generated by shifting the phase of the strobe signal DQS by the fifth negative reference phase NRP5.

An absolute value of the fifth positive reference phase PRP5 may be smaller than an absolute of the fourth positive reference phase PRP4, and an absolute value of the fifth negative reference phase NRP5 may be smaller than an absolute of the fourth negative reference phase NRP4.

For example, the timing controller 200 may maintain the power voltage PV as the initial voltage IV when the error bit BE does not occur in the test write operation and the test read operation performed based on the first positive test strobe signal PTDQS1 and the first negative test strobe signal NTDQS1.

For example, the timing controller 200 may increase the power voltage PV by a first rising value RV1 when the error bit BE occurs in the test write operation and the test read operation performed based on the first positive test strobe signal PTDQS1 or the first negative test strobe signal NTDQS1 and the error bit BE does not occur in the test write operation and the test read operation performed based on the second positive test strobe signal PTDQS2 and the second negative test strobe signal NTDQS2, and the timing controller 200 may increase the power voltage PV by a second rising value RV2 greater than the first rising value RV1 when the error bit BE occurs in the test write operation and the test read operation performed based on the first positive test strobe signal PTDQS1 or the first negative test strobe signal NTDQS1 and the error bit BE occurs in the test write operation and the test read operation performed based on the second positive test strobe signal PTDQS2 or the second negative test strobe signal NTDQS2.

For example, the timing controller 200 may increase the power voltage PV by the second rising value RV2 when the error bit BE occurs in the test write operation and the test read operation performed based on the second positive test strobe signal PTDQS2 or the second negative test strobe signal NTDQS2 and the error bit BE does not occurs in the test write operation and the test read operation performed based on the third positive test strobe signal PTDQS3 and the third negative test strobe signal NTDQS3, and the timing controller 200 may increase the power voltage PV by a third rising value RV3 greater than the second rising value RV2 when the error bit BE occurs in the test write operation and the test read operation performed based on the second positive test strobe signal PTDQS2 or the second negative test strobe signal NTDQS2 and the error bit BE occurs in the test write operation and the test read operation performed based on the third positive test strobe signal PTDQS3 or the third negative test strobe signal NTDQS3.

For example, the timing controller 200 may increase the power voltage PV by the third rising value RV3 when the error bit BE occurs in the test write operation and the test read operation performed based on the third positive test strobe signal PTDQS3 or the third negative test strobe signal NTDQS3 and the error bit BE does not occurs in the test write operation and the test read operation performed based on the fourth positive test strobe signal PTDQS4 and the fourth negative test strobe signal NTDQS4, and the timing controller 200 may increase the power voltage PV by a fourth rising value RV4 greater than the third rising value RV3 when the error bit BE occurs in the test write operation and the test read operation performed based on the third positive test strobe signal PTDQS3 or the third negative test strobe signal NTDQS3 and the error bit BE occurs in the test write operation and the test read operation performed based on the fourth positive test strobe signal PTDQS4 or the fourth negative test strobe signal NTDQS4.

Accordingly, by increasing a voltage value to be increased at once, a setting time of the power voltage PV may be shortened.

FIG. 13 is a table illustrating an example in which a display device according to embodiments of the present inventive concept increases a power voltage.

The display device according to the present embodiment is substantially the same as the display device 1000 of FIG. 1 except for case2. Thus, the same reference numerals are used to refer to the same or similar element, and any repetitive explanation will be omitted.

Referring to FIGS. 12*a* to 12*e*, and 13, the timing controller 200 may maintain the power voltage PV when the error bit BE occurs in the test write operation and the test read operation performed based on the first positive test strobe signal PTDQS1 or the first negative test strobe signal NTDQS1 and the error bit BE does not occur in the test write operation and the test read operation performed based on the second positive test strobe signal PTDQS2 and the second negative test strobe signal NTDQS2, and the timing controller 200 may increase the power voltage PV when the error bit BE occurs in the test write operation and the test read operation performed based on the first positive test strobe signal PTDQS1 or the first negative test strobe signal NTDQS1 and the error bit BE occurs in the test write operation and the test read operation performed based on the second positive test strobe signal PTDQS2 or the second negative test strobe signal NTDQS2.

For example, the timing controller 200 may maintain the power voltage PV as the initial voltage IV when the error bit BE occurs in the test write operation and the test read operation performed based on the first positive test strobe signal PTDQS1 or the first negative test strobe signal NTDQS1 and the error bit BE does not occur in the test write operation and the test read operation performed based on the second positive test strobe signal PTDQS2 and the second negative test strobe signal NTDQS2, and the timing controller 200 may increase the power voltage PV by the first rising value RV1 when the error bit BE occurs in the test write operation and the test read operation performed based on the first positive test strobe signal PTDQS1 or the first negative test strobe signal NTDQS1 and the error bit BE occurs in the test write operation and the test read operation performed based on the second positive test strobe signal PTDQS2 or the second negative test strobe signal NTDQS2.

Figure 14:
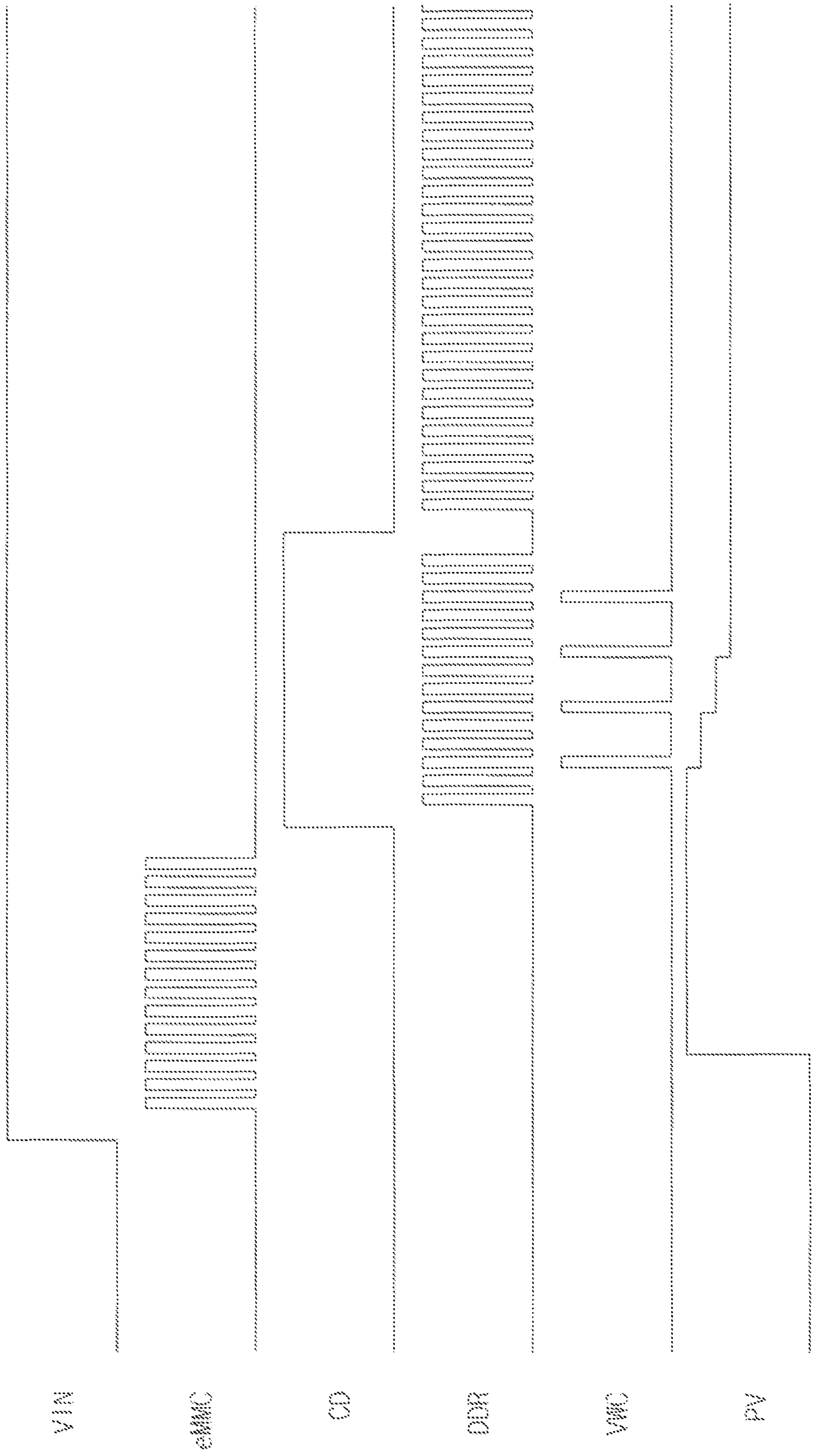
FIG. 14 is a diagram illustrating an example of an operation of a display device according to embodiments of the present inventive concept.
Figure 15:
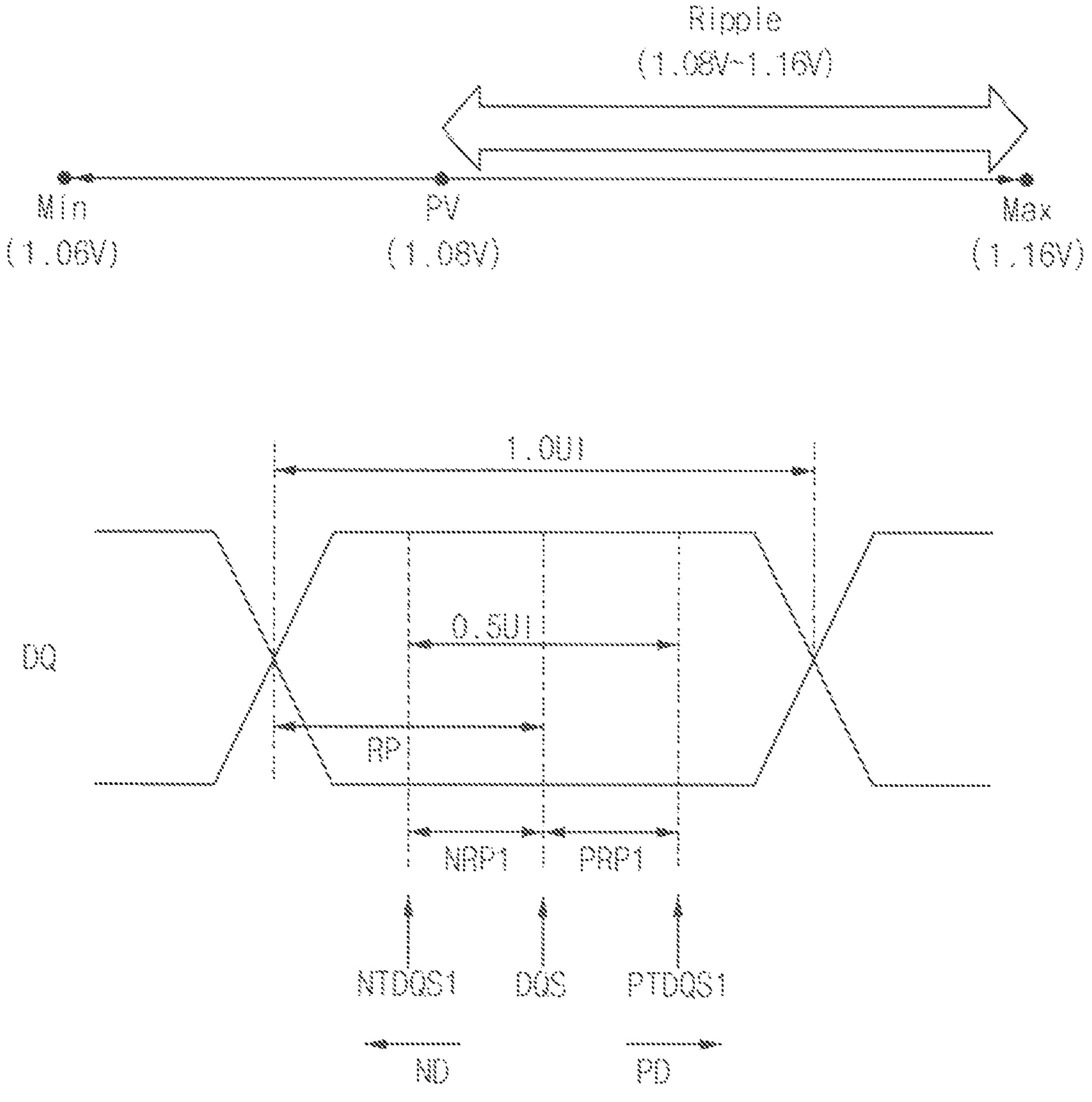
FIG. 15 is a diagram illustrating an example in which the display device of FIG. 14 decreases a power voltage.

FIG. 14 is a diagram illustrating an example of an operation of a display device according to embodiments of the present inventive concept, and FIG. 15 is a diagram illustrating an example in which the display device of FIG. 14 decreases the power voltage PV.

The display device according to the present embodiment is substantially the same as the display device 1000 of FIG.

1 except for decreasing the power voltage PV. Thus, the same reference numerals are used to refer to the same or similar element, and any repetitive explanation will be omitted.

Referring to FIGS. 1, 10, 14, and 15, the timing controller 200 may generate the test strobe signal TDQS by shifting the phase of the strobe signal DQS, perform the test write operation and the test read operation with the memory device 600 based on the test strobe signal TDQS, and decrease the power voltage PV when the error bit occurs in the test write operation and the test read operation.

the test strobe signal TDQS may include a first positive test strobe signal PTDQS1 generated by shifting the phase of the strobe signal DQS by the first positive reference phase PRP1 and a first negative test strobe signal NTDQS1 generated by shifting the phase of the strobe signal DQS by the first negative reference phase NRP1. The timing controller 200 may decrease the power voltage PV when the error bit occurs in the test write operation and the test read operation performed based on the first positive test strobe signal PTDQS1 or the first negative test strobe signal NTDQS1. That is, when any one of the first positive test strobe signal PTDQS1 and the first negative test strobe signal NTDQS1 generates the error bit, the timing controller 200 may increase the power voltage PV.

The timing controller 200 may perform the test write operation and the test read operation again when the error bit occurs in the test write operation and the test read operation performed based on the first positive test strobe signal PTDQS1 or the first negative test strobe signal NTDQS1. The timing controller 200 may stop the test write operation and the test read operation when the error bit does not occur in the test write operation and the test read operation performed based on the first positive test strobe signal PTDQS1 and the first negative test strobe signal NTDQS1. That is, the timing controller 200 may not decrease the power voltage PV when neither the first positive test strobe signal PTDQS1 nor the first negative test strobe signal NTDQS1 generate the error bit.

The power voltage PV may be decreased from a preset initial voltage. The power voltage PV may be initialized to the initial voltage when the display device 1000 is powered on. The initial voltage may be a maximum value of the voltage range of the supply voltage according to the interface standard between the timing controller 200 and the memory device 600.

For example, when the voltage range of the supply voltage according to the interface standard between the timing controller 200 and the memory device 600 is 1.06V to 1.16V, the initial voltage may be 1.16V.

For example, as shown in FIG. 15, it is assumed that the ripple increases in the direction in which the power voltage PV decreases, and a range of the ripple is 0.08V. And, for convenience of explanation, it is assumed that the error bit occurs when a voltage value that the power voltage PV can have (i.e., the power voltage PV and the ripple of the power voltage PV) is out of the voltage range of the supply voltage according to the interface standard (in practice, the probability may increase). The power voltage PV may be decreased from 1.16V. And, when the power voltage PV falls to 1.08V, the error bit may not occur. Accordingly, the power voltage PV of 1.08V may be applied to the timing controller 200 and the memory device 600. However, when the display device 1000 is powered off and then powered on, the power voltage PV may be 1.16V.

FIG. 16 is a table illustrating an example in which a display device according to embodiments of the present inventive concept decreases a power voltage.

The display device according to the present embodiment is substantially the same as the display device of FIG. 11 except for decreasing the power voltage PV. Thus, the same reference numerals are used to refer to the same or similar element, and any repetitive explanation will be omitted.

Referring to FIGS. 12*a* to 12*e*, and 16, for example, the timing controller 200 may maintain the power voltage PV as the initial voltage IV when the error bit BE does not occur in the test write operation and the test read operation performed based on the first positive test strobe signal PTDQS1 and the first negative test strobe signal NTDQS1.

For example, the timing controller 200 may decrease the power voltage PV by a first falling value FV1 when the error bit BE occurs in the test write operation and the test read operation performed based on the first positive test strobe signal PTDQS1 or the first negative test strobe signal NTDQS1 and the error bit BE does not occur in the test write operation and the test read operation performed based on the second positive test strobe signal PTDQS2 and the second negative test strobe signal NTDQS2, and the timing controller 200 may decrease the power voltage PV by a second falling value FV2 greater than the first falling value FV1 when the error bit BE occurs in the test write operation and the test read operation performed based on the first positive test strobe signal PTDQS1 or the first negative test strobe signal NTDQS1 and the error bit BE occurs in the test write operation and the test read operation performed based on the second positive test strobe signal PTDQS2 or the second negative test strobe signal NTDQS2.

For example, the timing controller 200 may decrease the power voltage PV by the second falling value FV2 when the error bit BE occurs in the test write operation and the test read operation performed based on the second positive test strobe signal PTDQS2 or the second negative test strobe signal NTDQS2 and the error bit BE does not occurs in the test write operation and the test read operation performed based on the third positive test strobe signal PTDQS3 and the third negative test strobe signal NTDQS3, and the timing controller 200 may decrease the power voltage PV by a third falling value FV3 greater than the second falling value FV2 when the error bit BE occurs in the test write operation and the test read operation performed based on the second positive test strobe signal PTDQS2 or the second negative test strobe signal NTDQS2 and the error bit BE occurs in the test write operation and the test read operation performed based on the third positive test strobe signal PTDQS3 or the third negative test strobe signal NTDQS3.

For example, the timing controller 200 may decrease the power voltage PV by the third falling value FV3 when the error bit BE occurs in the test write operation and the test read operation performed based on the third positive test strobe signal PTDQS3 or the third negative test strobe signal NTDQS3 and the error bit BE does not occurs in the test write operation and the test read operation performed based on the fourth positive test strobe signal PTDQS4 and the fourth negative test strobe signal NTDQS4, and the timing controller 200 may decrease the power voltage PV by a fourth falling value FV4 greater than the third falling value FV3 when the error bit BE occurs in the test write operation and the test read operation performed based on the third positive test strobe signal PTDQS3 or the third negative test strobe signal NTDQS3 and the error bit BE occurs in the test write operation and the test read operation performed based on the fourth positive test strobe signal PTDQS4 or the fourth negative test strobe signal NTDQS4.

Accordingly, by increasing a voltage value to be decreased at once, a setting time of the power voltage PV may be shortened.

FIG. 17 is a table illustrating an example in which a display device according to embodiments of the present inventive concept decreases the power voltage PV.

The display device according to the present embodiment is substantially the same as the display device of FIG. 13 except for decreasing the power voltage PV. Thus, the same reference numerals are used to refer to the same or similar element, and any repetitive explanation will be omitted.

Referring to FIGS. 12*a* to 12*e*, and 17, the timing controller 200 may maintain the power voltage PV when the error bit BE occurs in the test write operation and the test read operation performed based on the first positive test strobe signal PTDQS1 or the first negative test strobe signal NTDQS1 and the error bit BE does not occur in the test write operation and the test read operation performed based on the second positive test strobe signal PTDQS2 and the second negative test strobe signal NTDQS2, and the timing controller 200 may decrease the power voltage PV when the error bit BE occurs in the test write operation and the test read operation performed based on the first positive test strobe signal PTDQS1 or the first negative test strobe signal NTDQS1 and the error bit BE occurs in the test write operation and the test read operation performed based on the second positive test strobe signal PTDQS2 or the second negative test strobe signal NTDQS2.

For example, the timing controller 200 may maintain the power voltage PV as the initial voltage IV when the error bit BE occurs in the test write operation and the test read operation performed based on the first positive test strobe signal PTDQS1 or the first negative test strobe signal NTDQS1 and the error bit BE does not occur in the test write operation and the test read operation performed based on the second positive test strobe signal PTDQS2 and the second negative test strobe signal NTDQS2, and the timing controller 200 may decrease the power voltage PV by the first falling value FV1 when the error bit BE occurs in the test write operation and the test read operation performed based on the first positive test strobe signal PTDQS1 or the first negative test strobe signal NTDQS1 and the error bit BE occurs in the test write operation and the test read operation performed based on the second positive test strobe signal PTDQS2 or the second negative test strobe signal NTDQS2.

Figure 18:
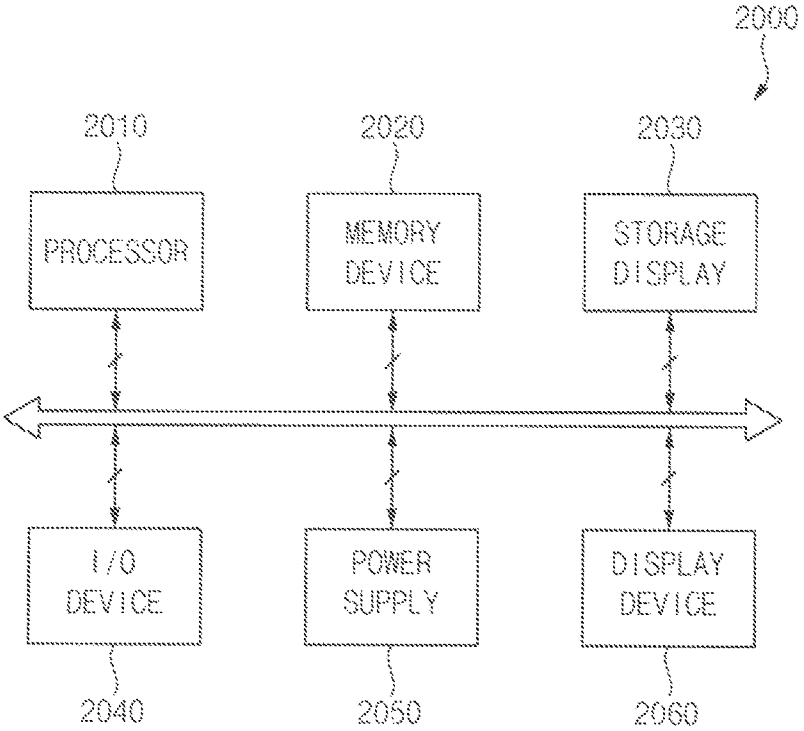
FIG. 18 is a block diagram showing an electronic device according to embodiments of the present inventive concept.
Figure 19:
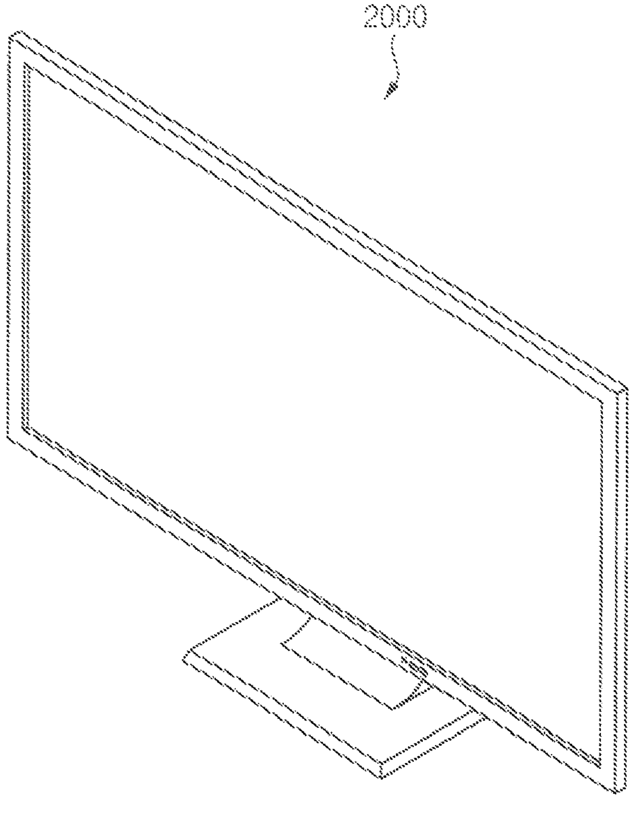
FIG. 19 is a diagram showing an example in which the electronic device of FIG. 18 is implemented as a television.

FIG. 18 is a block diagram showing an electronic device according to embodiments of the present inventive concept, and FIG. 19 is a diagram showing an example in which the electronic device of FIG. 11 is implemented as a television.

Referring to FIGS. 11 and 12, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In an embodiment, as shown in FIG. 19, the electronic device 2000 may be implemented as a television. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a micro processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc or at least one memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc, and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may vary the power voltage in consideration of the ripple characteristic. And the display device 2060 may minimize an occurrence of an error bit while maintaining the margin of a strobe signal. In addition, the display device 2060 may vary the power voltage in consideration of a decrease in capacitance.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plusfunction clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A display device comprising:
- a display panel including pixels;
- a data driver configured to apply data voltages to the pixels;
- a timing controller configured to control the data driver, to generate a test strobe signal by shifting a phase of a strobe signal, to perform a test write operation and a test read operation with a memory device based on the test strobe signal, and to increase a power voltage when an error bit occurs in the test write operation and the test read operation;
- the memory device configured to sample memory data received from the timing controller using the strobe signal and to store sampled memory data; and
- a power voltage generator configured to apply the power voltage to the memory device.

2. The display device of claim 1, wherein the timing controller is configured to perform the test write operation and the test read operation again when the error bit occurs in the test write operation and the test read operation.

3. The display device of claim 1, wherein the timing controller is configured to stop the test write operation and the test read operation when the error bit does not occur in the test write operation and the test read operation.

4. The display device of claim 3, wherein the timing controller is configured to perform the test write operation and the test read operation when the display device is powered on.

5. The display device of claim 1, wherein the test strobe signal includes a first positive test strobe signal generated by shifting the phase of the strobe signal by a first positive reference phase and a first negative test strobe signal generated by shifting the phase of the strobe signal by a first negative reference phase, and
- wherein the timing controller is configured to increase the power voltage when the error bit occurs in the test write operation and the test read operation performed based on the first positive test strobe signal or the first negative test strobe signal.

6. The display device of claim 5, wherein the timing controller is configured to perform the test write operation and the test read operation again when the error bit occurs in the test write operation and the test read operation performed based on the first positive test strobe signal or the first negative test strobe signal.

7. The display device of claim 5, wherein the timing controller is configured to stop the test write operation and the test read operation when the error bit does not occur in the test write operation and the test read operation performed based on the first positive test strobe signal and the first negative test strobe signal.

8. The display device of claim 5, wherein the test strobe signal includes a second positive test strobe signal generated by shifting the phase of the strobe signal by a second positive reference phase and a second negative test strobe signal generated by shifting the phase of the strobe signal by a second negative reference phase,
- wherein the timing controller is configured to increase the power voltage by a first rising value when the error bit occurs in the test write operation and the test read operation performed based on the first positive test strobe signal or the first negative test strobe signal and the error bit does not occur in the test write operation and the test read operation performed based on the second positive test strobe signal and the second negative test strobe signal, and
- wherein the timing controller is configured to increase the power voltage by a second rising value greater than the first rising value when the error bit occurs in the test write operation and the test read operation performed based on the first positive test strobe signal or the first negative test strobe signal and the error bit occurs in the test write operation and the test read operation performed based on the second positive test strobe signal or the second negative test strobe signal.

9. The display device of claim 8, wherein an absolute value of the second positive reference phase is smaller than an absolute of the first positive reference phase, and
- wherein an absolute value of the second negative reference phase is smaller than an absolute of the first negative reference phase.

10. The display device of claim 5, wherein the test strobe signal includes a second positive test strobe signal generated by shifting the phase of the strobe signal by a second positive reference phase and a second negative test strobe signal generated by shifting the phase of the strobe signal by a second negative reference phase,
- wherein the timing controller is configure to maintain the power voltage when the error bit occurs in the test write operation and the test read operation performed based on the first positive test strobe signal or the first negative test strobe signal and the error bit does not occur in the test write operation and the test read operation performed based on the second positive test strobe signal and the second negative test strobe signal, and
- wherein the timing controller is configured to increase the power voltage when the error bit occurs in the test write operation and the test read operation performed based on the first positive test strobe signal or the first negative test strobe signal and the error bit occurs in the test write operation and the test read operation performed based on the second positive test strobe signal or the second negative test strobe signal.

11. The display device of claim 1, wherein the power voltage is applied to an input/output buffer of the memory device.

12. The display device of claim 11, wherein the power voltage generator is configured to apply the power voltage to the timing controller, and
- wherein the power voltage is used as a core voltage of the timing controller and a core voltage of the memory device.

13. The display device of claim 1, wherein the power voltage is initialized to an initial voltage when the display device is powered on.

14. The display device of claim 13, wherein the initial voltage is a minimum value of a voltage range of a supply voltage according to an interface standard between the timing controller and the memory device.

15. A display device comprising:

a display panel including pixels;

a data driver configured to apply data voltages to the pixels;

a timing controller configured to control the data driver, to generate a test strobe signal by shifting a phase of a strobe signal, to perform a test write operation and a test read operation with a memory device based on the test strobe signal, and to decrease a power voltage when an error bit occurs in the test write operation and the test read operation;

the memory device configured to sample memory data received from the timing controller using the strobe signal and to store sampled memory data; and a power voltage generator configured to apply the power voltage to the memory device.

16. The display device of claim 15, wherein the test strobe signal includes a first positive test strobe signal generated by shifting the phase of the strobe signal by a first positive reference phase and a first negative test strobe signal generated by shifting the phase of the strobe signal by a first negative reference phase, and wherein the timing controller is configured to decrease the power voltage when the error bit occurs in the test write operation and the test read operation performed based on the first positive test strobe signal or the first negative test strobe signal.

17. The display device of claim 16, wherein the test strobe signal includes a second positive test strobe signal generated by shifting the phase of the strobe signal by a second positive reference phase and a second negative test strobe signal generated by shifting the phase of the strobe signal by a second negative reference phase, wherein the timing controller is configured to decrease the power voltage by a first falling value when the error bit occurs in the test write operation and the test read operation performed based on the first positive test strobe signal or the first negative test strobe signal and the error bit does not occur in the test write operation and the test read operation performed based on the second positive test strobe signal and the second negative test strobe signal, and wherein the timing controller is configured to decrease the power voltage by a second falling value greater than the first falling value when the error bit occurs in the test write operation and the test read operation performed based on the first positive test strobe signal or the first negative test strobe signal and the error bit occurs in the test write operation and the test read operation performed based on the second positive test strobe signal or the second negative test strobe signal.

18. The display device of claim 17, wherein an absolute value of the second positive reference phase is smaller than an absolute of the first positive reference phase, and wherein an absolute value of the second negative reference phase is smaller than an absolute of the first negative reference phase.

19. The display device of claim 15, wherein the power voltage is initialized to an initial voltage when the display device is powered on.

20. The display device of claim 19, wherein the initial voltage is a maximum value of a voltage range of a supply voltage according to an interface standard between the timing controller and the memory device.

* * * * *